(12) United States Patent
Rangasamy et al.

(10) Patent No.: US 10,892,942 B2
(45) Date of Patent: Jan. 12, 2021

(54) CONTAINER-BASED CLOUD EXCHANGE DISASTER RECOVERY

(71) Applicant: Equinix, Inc., Redwood City, CA (US)

(72) Inventors: Venkatachalam Rangasamy, San Jose, CA (US); Parveen Kumar, Fremont, CA (US); Jaganathan Jeyapaul, San Jose, CA (US); Brian J. Lillie, Los Altos, CA (US)

(73) Assignee: EQUINIX, INC., Redwood City, CA (US)

( * ) Notice: Subject to any disclaimer, the term of this patent is extended or adjusted under 35 U.S.C. 154(b) by 282 days.

(21) Appl. No.: 15/223,740

(22) Filed: Jul. 29, 2016

(65) Prior Publication Data

US 2017/0244593 A1 Aug. 24, 2017

Related U.S. Application Data

(60) Provisional application No. 62/286,259, filed on Jan. 22, 2016, provisional application No. 62/332,385, filed on May 5, 2016.

(51) Int. Cl.
*H04L 12/24* (2006.01)
*H04L 12/26* (2006.01)
(Continued)

(52) U.S. Cl.
CPC ...... *H04L 41/0654* (2013.01); *G06F 9/45558* (2013.01); *G06F 9/5077* (2013.01);
(Continued)

(58) Field of Classification Search
CPC ............. H04L 41/0654; H04L 41/0668; H04L 45/021; H04L 69/40; H04L 69/021;
(Continued)

(56) References Cited

U.S. PATENT DOCUMENTS 9,690,622 B1 6/2017 Argenti et al.
2004/0003035 A1* 1/2004 Sesek .................... H04L 69/329
709/203
(Continued)

FOREIGN PATENT DOCUMENTS

EP 2648391 A1 10/2013
WO 2009155574 A1 12/2009

OTHER PUBLICATIONS

Erick Krogstad, "Bring your Whole Army with Docker to Attact DR", Jun. 4, 2015, all pages, http://erikkrogstad.com/bring-your-whole-army-with-docker-to-attack-dr/ (Year: 2015).*
(Continued)

*Primary Examiner* — Nam T Tran
*Assistant Examiner* — Lam H Duong
(74) *Attorney, Agent, or Firm* — Shumaker & Sieffert, P.A.

(57) ABSTRACT

In general, this disclosure describes techniques for coordinating, with a cloud exchange, automated cloud-based disaster recovery across containers from a failed cloud service to a backup cloud service. In some examples, an orchestration engine for a cloud exchange is configured to: detect an indication of a disruption in a first cloud service provided by a first cloud service provider network coupled to the cloud exchange to send and receive data packets via the cloud exchange; provision, in response to detecting the indication of the disruption in the first cloud service, disaster recovery infrastructure layers in containers of a second cloud service provided by a second cloud service provider network coupled to the cloud exchange; obtain code and state from containers of the first cloud service; and communicate the code and state to the disaster recovery infrastructure layers in the containers of the second cloud service.

25 Claims, 7 Drawing Sheets

(51) Int. Cl.
G06F 9/455 (2018.01)
G06F 9/50 (2006.01)
H04L 12/46 (2006.01)
G06F 8/60 (2018.01)
H04L 29/08 (2006.01)
H04L 12/755 (2013.01)
H04L 29/14 (2006.01)
H04L 29/12 (2006.01)

(52) U.S. Cl.
CPC ...... H04L 12/4679 (2013.01); H04L 12/4683 (2013.01); H04L 41/5045 (2013.01); H04L 43/0817 (2013.01); H04L 43/10 (2013.01); H04L 45/021 (2013.01); H04L 61/3015 (2013.01); H04L 67/02 (2013.01); H04L 67/10 (2013.01); H04L 67/1095 (2013.01); H04L 67/1097 (2013.01); H04L 67/16 (2013.01); H04L 69/40 (2013.01); G06F 8/60 (2013.01); G06F 2009/4557 (2013.01); G06F 2009/45595 (2013.01); H04L 61/15 (2013.01)

(58) Field of Classification Search
CPC ......... H04L 67/10; H04L 61/15; H04L 43/10; H04L 67/1097; H04L 67/1095; H04L 67/02; H04L 67/16; H04L 61/3015; H04L 41/5045; H04L 12/4683; H04L 12/4679; H04L 43/0817; G06F 9/5077; G06F 9/45558; G06F 2009/4557; G06F 2009/45595; G06F 8/60
USPC ........................................................ 709/224
See application file for complete search history.

(56) References Cited

U.S. PATENT DOCUMENTS

| | | | |
|---|---|---|---|
| 2004/0205101 A1 | 10/2004 | Radhakrishnan | |
| 2010/0191851 A1 | 7/2010 | Raja et al. | |
| 2012/0030672 A1 | 2/2012 | Zygmuntowicz et al. | |
| 2012/0054367 A1* | 3/2012 | Ramakrishnan | G06F 9/4856 709/242 |
| 2012/0151057 A1* | 6/2012 | Paredes | H04L 12/4641 709/225 |
| 2013/0066940 A1* | 3/2013 | Shao | H04L 67/1025 709/201 |
| 2013/0268643 A1 | 10/2013 | Chang et al. | |
| 2013/0297662 A1 | 11/2013 | Sharma et al. | |
| 2014/0075243 A1 | 3/2014 | Nagaraj | |
| 2014/0130038 A1 | 5/2014 | Lucovsky et al. | |
| 2014/0201218 A1 | 7/2014 | Catalano et al. | |
| 2014/0317261 A1 | 10/2014 | Shatzkamer et al. | |
| 2014/0325515 A1* | 10/2014 | Salmela | G06F 9/45533 718/1 |
| 2014/0337528 A1 | 11/2014 | Barton et al. | |
| 2014/0344395 A1* | 11/2014 | Alexander | G06F 9/4856 709/217 |
| 2014/0359128 A1* | 12/2014 | Bhattacharya | G06F 9/4856 709/226 |
| 2014/0366155 A1 | 12/2014 | Chang et al. | |
| 2015/0052525 A1 | 2/2015 | Raghu | |
| 2015/0112944 A1* | 4/2015 | Wu | G06F 11/2097 707/652 |
| 2015/0156251 A1 | 6/2015 | Zhou | |
| 2015/0234644 A1* | 8/2015 | Ramanathan | H04L 41/5045 709/226 |
| 2015/0326648 A1* | 11/2015 | Diwakar | G06F 9/5072 709/201 |
| 2015/0370586 A1 | 12/2015 | Cooper et al. | |
| 2016/0088092 A1 | 3/2016 | Cardona-Gonzalez et al. | |
| 2016/0110210 A1* | 4/2016 | Vecera | G06F 9/45558 718/1 |
| 2016/0127454 A1 | 5/2016 | Maheshwari et al. | |
| 2016/0219019 A1 | 7/2016 | Mathur et al. | |
| 2016/0330138 A1 | 11/2016 | Thomason | |
| 2016/0337474 A1 | 11/2016 | Rao | |
| 2016/0350105 A1 | 12/2016 | Kumar et al. | |
| 2016/0373275 A1 | 12/2016 | Al-Asaaed et al. | |
| 2017/0041384 A1* | 2/2017 | Son | H04L 67/1002 |
| 2017/0052807 A1 | 2/2017 | Kristiansson et al. | |
| 2017/0118042 A1 | 4/2017 | Bhattacharya et al. | |
| 2017/0147324 A1 | 5/2017 | Weber et al. | |
| 2017/0149687 A1* | 5/2017 | Udupi | H04L 47/78 |

OTHER PUBLICATIONS

U.S. Appl. No. 14/927,451, by Gagan Maheshwari, et al., filed Oct. 29, 2015.
U.S. Appl. No. 15/099,407, by Juxiang Teng, et al., filed Oct. 29, 2015.
U.S. Appl. No. 14/927,306, by Parveen Kumar, et al., filed Oct. 29, 2015.
Grattafiori, "Understanding and Hardening Linux Containers," NCC Group Whitepaper,Version 1.0, Apr. 20, 2016, 122 pp.
"Docker Overview," Docker, Inc., retrieved from docs.docker.com/engine/understanding-docker, Jul. 9, 2016, 10 pp.
Brand et al., "Manage Workflows, Save Staff Time with Hybrid Cloud Automation," retrieved from community.netapp.com/t5/Tech-OnTap-Articles/Manage-Workflows-Save-Staff-Time-with-Hybrid-Cloud-Automation/ta-p/116816, Mar. 25, 2016, 5 pp.
Invitation to Restrict or Pay Additional Fees from International Application No. PCT/US2016/69626, dated Mar. 7, 2017, 2 pp.
International Search Report and Written Opinion of International Application No. PCT/US2016/1669626, dated May 4, 2017, 15 pp.
International Preliminary Report on Patentability from International Application No. PCT/US2016/069626, dated Aug. 2, 2018, 12 pp.

* cited by examiner

CONTAINER-BASED CLOUD EXCHANGE DISASTER RECOVERY

This application claims the benefit of U.S. Provisional Application No. 62/286,259 filed Jan. 22, 2016 and U.S. Provisional Application No. 62/332,385 filed May 5, 2016, the entire contents of which are incorporated herein by reference.

TECHNICAL FIELD

The disclosure relates to computer networks and, more specifically, to cloud computing services.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "cloud services," refers not only to services provided by a cloud, but also to a form of service provisioning in which cloud service customers contract with cloud service providers for the online delivery of services provided by the cloud. Cloud service providers ("CSPs") manage a public, private, or hybrid cloud to facilitate the online delivery of cloud services to one or more cloud service customers.

A cloud exchange may allow private networks of a customer of the cloud exchange to be interconnected to any other customer of the cloud exchange at a common point, thereby allowing direct exchange of network traffic between the networks of the customers. Customers may include network carriers (or network service providers), enterprises, and other users of cloud services offered by one or more CSPs. One example use of a cloud exchange is to interface a group of customers to a group of CSPs. Each CSP may provide customer access to a "cloud" computing network, wherein the customer stores, manages, and processes data on a network of remote servers rather than on a local server or personal computer of the customer.

SUMMARY

In general, this disclosure describes techniques for coordinating, with a cloud exchange, automated cloud-based disaster recovery (DR) across containers (e.g., Docker containers, Linux Container (LXC) containers, CoreOS Rocket containers) from a failed or disrupted cloud service to a backup cloud service. In various examples, an orchestration engine of the cloud exchange includes a disaster recovery (DR) manager that detects an indication of a disruption in service delivery by a cloud service to an enterprise customer of the cloud exchange provider, and begins copying and preserving code, data, and other state from the failed cloud service. The DR manager provisions layers of a new DR infrastructure in containers of a cloud service provider that the DR manager has selected to host the DR infrastructure as a backup for the failed cloud service and thereby provide, at least temporarily, a backup cloud service to the enterprise. The DR infrastructure may include multiple layers corresponding to different functions of the cloud service. Such DR infrastructure layers may include a storage layer, compute layer, network layer, and/or interface layer.

In some examples, the DR infrastructure in the backup cloud service may not be immediately available to handle service requests from the enterprise customer. To avoid lost service requests while the DR infrastructure is being provisioned, the DR manager of the cloud exchange may provision a DR infrastructure interface layer to temporarily intercept and buffer service requests being sent by the enterprise to the failed cloud service. The cloud exchange networking platform may be configured to direct service requests from the enterprise customer to the DR infrastructure interface layer of the cloud exchange during this temporary buffering period.

The DR manager may push the copied code, data, and other state to the new DR infrastructure in the containers of the backup cloud service. Once the DR infrastructure is fully provisioned in the backup cloud service and therefore capable of handling service requests, the DR infrastructure interface layer may send the buffered service requests to the new DR infrastructure, as executed by containers in the backup cloud service, for processing. In some cases, the cloud exchange may provide inter-container communications between the failed cloud service and the new DR infrastructure in the backup cloud service. The complete set of DR activities performed and orchestrated by the cloud exchange orchestration engine involving the failed cloud service and the selected backup cloud service may be referred to as a DR process. The failed cloud service and the backup cloud service may be offered by respective cloud service providers co-located within a data center to interconnect with and provide cloud services to an enterprise via the cloud exchange.

In some cases, the DR manager may lock, or place a hold on, the operations of one or more executing containers of the failed cloud service and copy code, data, and other state for applications, microservices, runtime, and other resources from the containers of the failed cloud service. Placing the hold on the operations of the one or more of the containers of the first cloud service may include locking state stored to an in-memory data store at the first cloud service. The DR manager at the cloud exchange may thereby copy the containers while the containers are in the midst of execution, including copying and preserving current operations and instructions in the midst of execution, without interfering with the execution of the container and its applications and/or other resources.

The DR manager may then communicate and copy the code and state copied from the containers of the failed cloud service to the containers of the new DR infrastructure layers at the selected backup cloud service, once the DR infrastructure has been provisioned at the backup cloud service. The DR manager of the cloud exchange may thus clone processes, instructions, and other events being executed by containers at the failed cloud service, orchestrate the reproduction of the code and state from the containers of the failed cloud service in the containers of the backup cloud service, and resume execution of the processes, instructions, and other events from the failed cloud service in the containers of the backup cloud service, from where those processes, instructions, and other events left off, including in mid-execution.

The techniques of this disclosure may provide various advantages. For instance, a cloud exchange provider may leverage the techniques of this disclosure to provide, via a cloud exchange, containerized disaster recovery services to an enterprise customer. The enterprise customer may purchase cloud-based resources from one or more cloud service providers ("CSPs") for executing container-based applications deployed to a first cloud service operated by the CSP by the enterprise. The cloud exchange may provision connectivity between an enterprise customer of the cloud exchange and containers executing at a cloud service, with disaster recovery responsiveness and disaster recovery infrastructure creation and operation enabled seamlessly as part of the cloud computing services contracted for by the enterprise with the cloud exchange provider. The cloud exchange may remain alert to any indications of disruption to the functions provided by the cloud service, and may remain ready to intervene and initiate a set of DR processes if the cloud exchange detects a qualifying disruption, as may be previously user-defined as part of the DR services.

In the event of detecting a qualifying disruption, the cloud exchange may implement the DR processes, thereby copying the code and state from the containers of a failed cloud service to containers of a selected backup cloud service, potentially across a large and potentially heterogeneous array of container provisioning resources among a plurality of heterogeneous cloud services. Once replicated versions of the containers from the failed cloud service are up and running at the backup cloud service, the cloud exchange may also redirect cloud service traffic, such as application flows, to the replicated containers at the failed cloud service, without needing to change the Uniform Resource Identifiers (URIs) of the containerized resources provisioned to the backup cloud service. A cloud exchange configured to perform disaster recovery techniques of this disclosure may thus expand the scope and flexibility of container resources available to a cloud service customer without imposing container management and disaster recovery burdens on the cloud service customer. In ways such as these, a cloud exchange of this disclosure facilitates seamless disaster recovery in the cloud.

In one example, this disclosure describes a method that includes detecting, with a cloud exchange, an indication of a disruption in a first cloud service provided by a first cloud service provider network coupled to the cloud exchange to send and receive data packets via the cloud exchange. The method further includes provisioning, with the cloud exchange, in response to detecting the indication of the disruption in the first cloud service, disaster recovery infrastructure layers in containers of a second cloud service provided by a second cloud service provider network coupled to the cloud exchange to send and receive data packets via the cloud exchange. The method further includes obtaining, with the cloud exchange, code and state from containers of the first cloud service. The method further includes communicating, with the cloud exchange, the code and state to the disaster recovery infrastructure layers in the containers of the second cloud service.

In another example, this disclosure describes a computing device comprising: at least one processor operably coupled to a memory; and an orchestration engine of a cloud exchange, the orchestration engine configured for execution by the at least one processor. The orchestration engine is configured to detect an indication of a disruption in a first cloud service provided by a first cloud service provider network coupled to the cloud exchange to send and receive data packets via the cloud exchange. The orchestration engine is further configured to provision, in response to detecting the indication of the disruption in the first cloud service, disaster recovery infrastructure layers in containers of a second cloud service provided by a second cloud service provider network coupled to the cloud exchange to send and receive data packets via the cloud exchange. The orchestration engine is further configured to obtain code and state from containers of the first cloud service. The orchestration engine is further configured to communicate the code and state to the disaster recovery infrastructure layers in the containers of the second cloud service.

In another example, this disclosure describes a computer-readable medium comprising instructions for causing at least one programmable processor of a cloud exchange to detect an indication of a disruption in a first cloud service provided by a first cloud service provider network coupled to the cloud exchange to send and receive data packets via the cloud exchange. The instructions further cause the at least one programmable processor of the cloud exchange to provision, in response to detecting the indication of the disruption in the first cloud service, disaster recovery infrastructure layers in containers of a second cloud service provided by a second cloud service provider network coupled to the cloud exchange to send and receive data packets via the cloud exchange. The instructions further cause the at least one programmable processor of the cloud exchange to obtain code and state from containers of the first cloud service. The instructions further cause the at least one programmable processor of the cloud exchange to communicate the code and state to the disaster recovery infrastructure layers in the containers of the second cloud service.

In another example, this disclosure describes a cloud exchange comprising: a network; and an interconnection platform configured to configure the network to interconnect a plurality of private networks, the interconnection platform comprising means for performing the aforementioned methods.

In another example, this disclosure describes a data center comprising: a cloud exchange comprising a network; and an interconnection platform configured to configure the cloud exchange to interconnect a plurality of private networks, the interconnection platform comprising means for performing the aforementioned methods.

In another example, this disclosure describes a computer-readable storage medium comprising instructions for causing one or more programmable processors to perform the aforementioned methods.

In another example, this disclosure describes a computer-readable medium comprising instructions for configuring at least one programmable processor to perform the aforementioned methods.

The details of one or more examples of the techniques of this disclosure are set forth in the accompanying drawings and the description below. Other features, objects, and advantages of the techniques of this disclosure will be apparent from the description and drawings, and from the claims.

BRIEF DESCRIPTION OF DRAWINGS

Like reference characters denote like elements throughout the figures and text.

DETAILED DESCRIPTION

Figure 1:
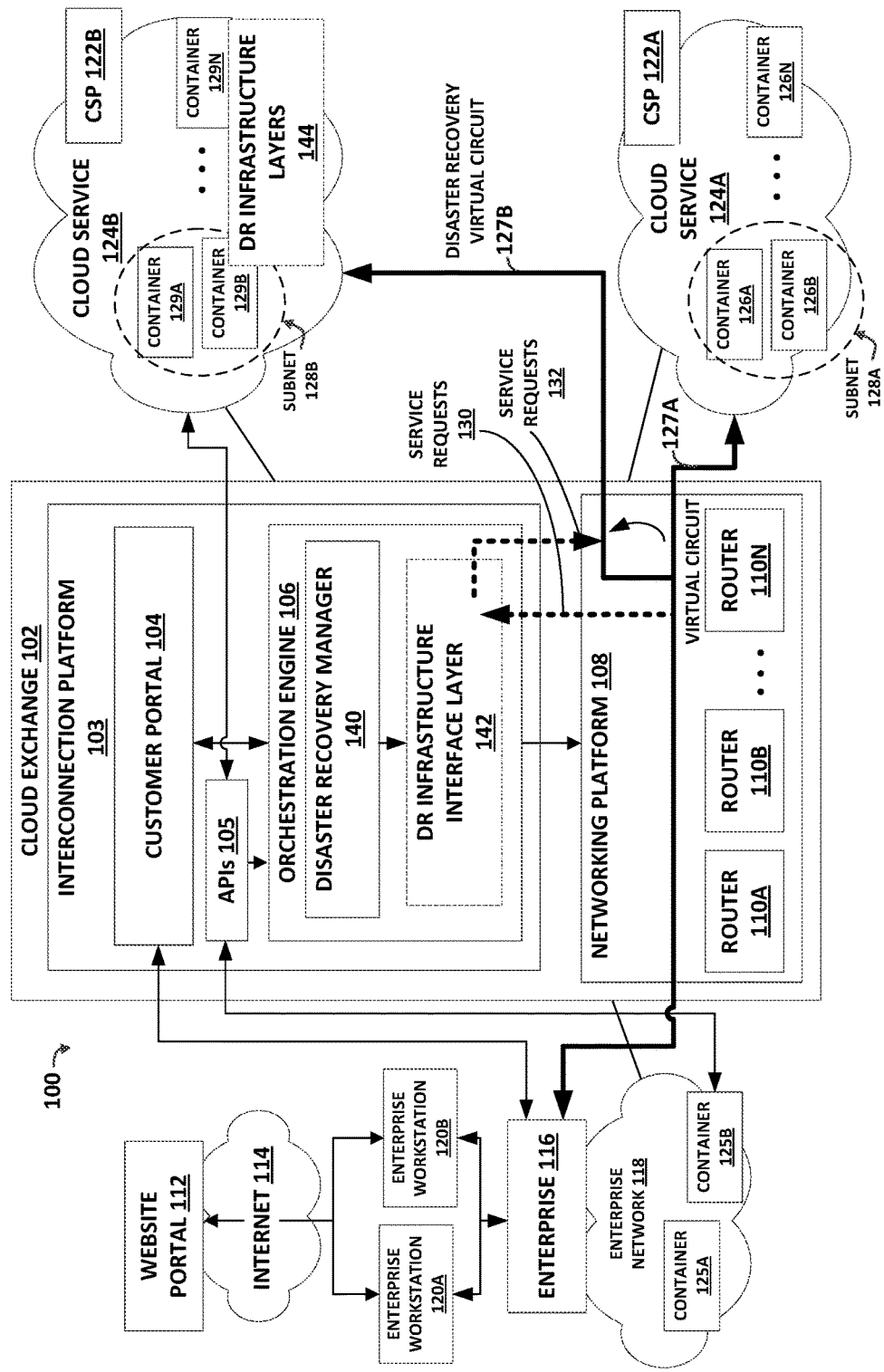
FIG. 1 is a block diagram illustrating an example network in accordance with example techniques of this disclosure.

In general, this disclosure describes techniques for coordinating, by a cloud exchange, automated cloud-based disaster recovery (DR) processes across containers (e.g., Docker containers, LXC containers, CoreOS Rocket containers) at different, logically isolated cloud service networks. An orchestration engine of the cloud exchange may include a disaster recovery manager ("DR manager") that detects an indication of a qualifying disruption in a cloud service provided to an enterprise customer of the cloud exchange, copies and preserves data and other state from the cloud service provider network that provides the cloud service, selects a second cloud service to host a DR infrastructure, provisions layers of the new DR infrastructure in containers in the selected second cloud service, and provisions a DR infrastructure interface layer to receive and buffer service requests from the enterprise customer network until the containers of the newly provisioned DR infrastructure layers at the selected second cloud service are operational to handle the service requests.

For example, techniques are described for transferring the state of a first container at the initial cloud service, including all executable code and state involved in the applications, microservices, runtime, and other resources executing on the first container, including the state of resources in mid-execution, to a second container of a newly provisioned DR infrastructure at a second cloud service, such that the applications, microservices, runtime, and other resources continue executing on the second container in the second cloud service. The initial cloud service and selected second cloud service may have different cloud service infrastructure technology and may be private or public cloud services. The initial cloud service and selected second cloud service may be provided by different cloud service providers. The initial cloud service provider network and the selected second cloud service provider network may be co-located in a data center (or "colocation facility") deployed by a cloud exchange provider and that includes that the cloud exchange to interconnect the initial cloud service provider network and the enterprise customer network, as well as the second selected cloud service provider network and the enterprise customer network. Techniques of this disclosure may include internally managing all aspects of translating the code and state for applications, runtime, and other resources between the different cloud infrastructure technology stacks. Techniques of this disclosure may thus ensure that the containerized applications are replicated from an initial cloud service to a disaster recovery infrastructure at a second cloud service smoothly and with all technology infrastructure differences between the different cloud services automatically managed and made compatible by the cloud exchange, as if the potentially heterogeneous cloud services were a uniform container provisioning resource, while also providing transparency into the DR processes to the customers or other users.

FIG. 1 is a block diagram illustrating an example system in accordance with example techniques of this disclosure. A cloud exchange may facilitate virtual connections for cloud services delivery with disaster recovery capability from one or more cloud service providers to one or more cloud service customers. The cloud exchange may enable cloud customers, such as enterprise customers of the cloud exchange provider, to bypass the public Internet to directly connect to cloud service providers ("CSPs") so as to improve performance, reduce costs, increase the security and privacy of the connections, and leverage cloud computing for additional applications. In this way, enterprises, network carriers, and SaaS customers, for instance, can integrate cloud services with their internal applications as if such services were part of or otherwise directly coupled to their own data center network. The cloud exchange includes an orchestration engine that performs disaster recovery functions that include replicating containers and applications executing in the containers from an affected cloud service to a selected second cloud service.

Cloud exchange 102 may interface cloud service customers such as enterprise 116 to a plurality of cloud services 124A-124B (collectively, "cloud services 124") provided by CSPs 122A-122B. As one example of a cloud exchange, an Equinix Cloud Exchange (ECX) provided by Equinix, Inc. may interface a plurality of cloud service customers (e.g., enterprises, organizations, and individuals) to a plurality of CSPs (e.g., such as Microsoft Azure and Amazon Webservices). Cloud exchange 102 may provide one or more interconnections for cloud services delivery from the multiple CSPs 122 to enterprise 116, as well as interconnections between the multiple CSPs 122. An interconnection may represent a physical cross-connect or a virtual circuit in various examples. Additional details of interconnecting networks via a cloud exchange are found in U.S. patent application Ser. No. 14/927,451, U.S. Provisional Application No. 62/286,259, U.S. patent application Ser. No. 15/099,407, and U.S. patent application Ser. No. 14/927,306, the contents of which are hereby incorporated in their entireties by reference herein. Cloud exchange 102 includes an orchestration engine 106 configured with a disaster recovery (DR) manager enabled to perform DR processes, as further described below.

A CSP may provide a virtual machine hypervisor (VM) to a cloud service customer for access to the cloud network. A VM emulates virtual hardware. In other words, each VM provides a virtualized operating system and application suite for customer access. Because the VM is virtualized, the cloud service customer and its applications are isolated from both the hardware of the host and the VMs of other customers. This allows the CSP to provide cloud services that are safe and secure to the cloud service customer. The CSP may implement dozens or hundreds, for example, of VMs on a single network for access by a group of customers. However, because each VM virtualizes a complete operating system, it may consume a significant level of network resources.

A more efficient alternative to a virtual machine in many applications is a virtualized container, such as provided by the open-source Docker container application, LXC containers, or CoreOS Rocket containers. Like a VM, each container is virtualized and may remain isolated from a host machine and other containers. However, unlike a VM, each container may omit a full individual operating system, and instead provide only an operating system kernel interface, an application suite, and application-specific libraries. Each container may be executed by the host machine as an isolated user-space instance, and may share an operating system and common libraries with other containers executing on the host machine. In other words, each container may be a user-space instance from a plurality of user-space instances that share an operating system executing on the host. Thus, a cloud network using containers may require significantly less processing power, storage, and network resources than a cloud network implementing VMs. As used herein, containers may also be referred to as virtualization engines, virtual private servers, silos, or jails.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container's) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine. Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016; and in Aaron Grattafiori, "Understanding and Hardening Linux Containers," NCC Group, Apr. 20, 2016; each of which are incorporated by reference herein in their entireties.

Enterprise 116 deploys an enterprise network 118, such as an enterprise on-premises data center or private cloud, to execute containers 125A, 125B, which provide an operating environment for applications deployed by enterprise 116. In some cases, applications executed by containers 125A, 125B may be microservices. In general, microservices each implement a set of focused and distinct features or functions, and a microservice conforms to (or is usable in) an architectural pattern in which many dozens or hundreds of microservices can be independently developed and deployed. Microservices may be organized around a business capability and may implement a "broad-stack" of software for the business capability, including persistent storage and any external collaboration. The various microservices expose interfaces that enable the microservices to invoke one another to exchange data and perform the respective sets of functions in order to create one or more overall applications. Each of the microservices may adhere to a well-defined Application Programming Interface (API) and may be orchestrated by invoking the API of the microservice. Each of the microservices executes independently and exposes an interface for asynchronous invocation with respect to the other microservices.

Via cloud exchange 102, CSPs 122A-122B may make available cloud services 124A-124B, respectively, to cloud service customers such as enterprise 116, and thereby provide execution environments for applications of enterprise 116. In the illustrated example, each cloud service 124 may host or include a plurality of containers 126, 129 that each provides an execution environment for at least one application (e.g., microservice) deployed by enterprise 116. For example, cloud service 124A may comprise containers 126A, 126B, . . . 126N, which may represent any number of containers (within the constraints of engineering) executing on computing resources of cloud service 124A, and cloud service 124B may comprise containers 129A, 129B, . . . 129N, which may likewise represent any number of containers executing on computing resources of cloud service 124B. Applications executing on containers 125 may communicate with applications executing on containers 126, 129 via virtual circuits 127A, 127B ("virtual circuits 127") provisioned for cloud exchange 102 to interconnect enterprise 116 with cloud services 124. DR manager 140 of cloud exchange 102 may provision virtual circuits 127 in networking platform 108 of cloud exchange 102, to transport data packets between containers 126 of the first cloud service 124A and containers 129 of the second cloud service 124B. DR manager 140 of cloud exchange 102 may communicate code and state from the containers 126 of the first cloud service 124A to the containers 129 of the DR infrastructure layers 144 of the second cloud service 124B via virtual circuits 127.

Further, a cloud service may group a plurality of containers into network subnets for organizational and network addressing purposes. In the example of FIG. 1, cloud service 124A may group representative containers 126A and 126B (for example) into subnet 128A, while cloud service 124B may group containers 129A and 129B (for example) into subnet 128B. Containers 126A and 126B of subnet 128A may execute on the same or on different hosts (e.g., servers, computer hardware units, or other computing resources), the one or more hosts being addressable by a network address that is a member of subnet 128A. In one example, a cloud service may group a plurality of containers into a plurality of subnets to organize services into different subnets. In another example, a cloud service may group a plurality of containers into a plurality of subnets to divide containers among customers of the cloud service.

Cloud exchange 102 includes an interconnection platform 103 that may expose a collection of software interfaces, also referred to and described herein as application programming interfaces (APIs) 105, which may allow access to capabilities and assets of the interconnection platform in a programmable manner. The APIs 105 may provide an extensible framework that allows software developers associated with customers and partners of cloud exchange 102 to build software applications that access interconnection platform 103 that automatically manages interconnection with multiple cloud service providers 122 participating in interconnection platform 103, to provide interconnection and other services described herein to customers of the provider of cloud exchange 102. Developers from network services providers, cloud service providers, managed service providers, and other enterprises may use the software interfaces exposed by interconnection platform 103 and defined by APIs 105 to build custom applications and frameworks for seamless interaction with interconnection platform 103, to facilitate the delivery of cloud services from cloud service providers 122 to cloud service customers.

These software interfaces defined by APIs 105 enable machine-to-machine communication for near real-time setup and modifications of interconnections, and facilitate inter-container communications and container control as described herein. The software interfaces defined by APIs 105 may also reduce or eliminate the need for human interaction for the entire interconnection setup and management process. In this way, the software interfaces provide an automated and seamless way to use and manage containers executing at multiple different cloud services or networks connected to cloud exchange 102.

Enterprise 116 may interface a plurality of enterprise workstations 120A-120B (collectively, "enterprise workstations 120") of enterprise 116 to networks outside of enterprise 116. Enterprise 116 may interface enterprise workstations 120 to websites connected to the Internet 114, for example, website portal 112, which may provide enterprise workstations 120 with access to the website of one of CSPs 122. Further, enterprise 116 may interface enterprise workstations 120 to cloud exchange 102. As used herein, actions imputed to enterprise 116, cloud exchange 102, or CSPs 122 may refer to a human operator or automated agent directed by the enterprise 116, cloud exchange 102, or CSP 122, respectively. Each of enterprise network 118, cloud service provider 122 networks, and cloud exchange 102 may be located within a data center (or "colocation facility" or "interconnection facility").

Enterprise workstations 120 may access customer portal 104 to log into cloud exchange 102. Customer portal 104 may represent a web-based application exposed to customers via a website and accessible using a browser. Customers may use customer portal 104 to sign up for or register cloud services. After a customer has registered with cloud exchange 102 via customer portal 104, the customer may receive a service license identifier (e.g., a registration key). The service license identifier may identify the customer, the type of customer (e.g., business or individual), the services the customer has access to (e.g., public cloud services provided by, e.g., Microsoft Azure or Amazon Webservices), and service parameters such as an amount of service purchased in terms of, e.g., cloud service provider resources (e.g., bandwidth, processing units). Via customer portal 104, e.g., an agent of enterprise 116 may request disaster recovery services from cloud exchange 102, as described in further detail below.

In some examples, interconnection platform 103 may conform to a microservice-based application architecture. In the example of FIG. 1, interconnection platform 103 includes an internal orchestration engine 106 that organizes, directs, and integrates underlying microservices, as well as other software and network sub-systems, for managing various service provided by the cloud exchange 102. Orchestration engine 106 includes a disaster recovery (DR) manager 140, as further described below.

Orchestration engine 106 of the interconnection platform 103 for cloud exchange 102 may facilitate the dynamic creation of private connections between enterprise 116 and any of CSPs 122, as well as between CSPs 122 and cloud service customers, network service providers, a cloud exchange administrator, or other customers or users of the cloud exchange. Orchestration engine 106 may receive registration information and service license identifiers from customer portal 104 obtained from users at registration. The orchestration framework may use this information to coordinate interactions between a heterogeneous set of unrelated APIs, microservices, Web services, sockets, remote method invocations (RMIs), and analogous entities and services, that are orchestrated through a workflow, to seamlessly create a private connection between the enterprise and one or more of the cloud service providers. Orchestration engine 106 may be responsible for handling the entire request, which may be received from various channels such as a web portal and an API. Specific techniques for the design and implementation of an orchestration engine are described in U.S. Provisional Application No. 62/072,976, U.S. Provisional Application No. 62/286,259, and U.S. patent application Ser. No. 14/927,306, incorporated above.

Networking platform 108 may comprise a plurality of routers and switches 110A-110N (collectively, "routers 110"), where "N" represents any number of routers and switches. Networking platform 108 may use routers 110 to transfer data between and among enterprise 116 and cloud services 124A-124B. Orchestration engine 106 may administer networking platform 108 to facilitate the dynamic creation of private connections between enterprise 116 and cloud services 124A-124B. In the example of FIG. 1, orchestration engine 106 may provision a virtual circuit 127A in the form of a virtual local area network (VLAN)-based or Internet Protocol-Virtual Private Network (IP-VPN)-based connection, for instance, between enterprise 116 and the CSP 122A network to allow for data transfer between enterprise 116 and CSP 122A. Virtual circuit 127A may represent an L2 connection or an end-to-end L3 connection, for instance. Virtual circuit 127A may include a VLAN between cloud service 124A and networking platform 108 operating over a physical cross-connect from the cloud service 124A network and a port of networking platform 108. In some cases, orchestration engine 106 may provision a virtual circuit (not shown) to interconnect the respective networks of CSPs 122A and 122B. Thus, in accordance with example techniques of this disclosure, orchestration engine 106 may act to facilitate secure, fast, and efficient connections between the networks of enterprise 116 and cloud service providers 122.

In accordance with example techniques of this disclosure, for purposes of disaster recovery (DR) operations, cloud exchange 102 may facilitate communications between containers executing at an initial cloud service 124A and cloud exchange 102, between cloud exchange 102 and containers executing at a selected second cloud service 124B, and in some cases between the containers executing at the initial cloud service 124A and the containers executing at a selected second cloud service 124B. In particular, according to an example DR process of this disclosure, DR manager 140 of orchestration engine 106 executing at cloud exchange 102 may set up a DR infrastructure interface layer 142 at orchestration engine 106 and provision DR infrastructure layers 144 in selected second cloud service 124B. DR infrastructure interface layer 142 may include one or more microservices and may represent or execute an API gateway.

In some cases, prior to detecting an indication of a disruption in the initial cloud service, DR manager 140 configures a DR infrastructure interface layer 142 for enterprise 116 according to configuration settings for enterprise 116 disaster recovery. The pre-configured DR infrastructure interface layer 142 may include (or expose) API endpoints to receive service requests 130 from enterprise 116. As a result, immediately upon detecting an indication of the disruption in the initial cloud service, DR recovery manager 140 may cause, by configuring network platform 108, service requests 130 to be directed to pre-configured DR infrastructure interface layer 142. This "circuit breaker" approach ensures that service requests 130 are not forwarded to a failed cloud service 124A and instead are buffered by DR infrastructure interface layer 142. DR manager 140 of cloud exchange 102 may thus buffer or temporarily store incoming service requests, prior to the disaster recovery infrastructure layers in the containers of the second cloud service being operational to handle the service request. DR manager 140 of cloud exchange 102 may thereafter send the buffered service requests to the second cloud service, in response to determining that the disaster recovery infrastructure layers in the containers of the second cloud service are operational to handle the service requests.

DR manager 140 may also provision virtual circuits for direct data communications between the initial cloud service 124A and DR infrastructure interface layer 142 and between DR infrastructure interface layer 142 and the selected second cloud service 124B. For example, DR manager 140 may provision a VLAN for a physical cross-connect between the cloud service 124B network and network platform 108 for exchanging data communications between interconnection platform 103 and the cloud service 124B network. As another example, DR manager 140 may provision a VLAN for a physical cross-connect between the cloud service 124A network and network platform 108 for exchanging data communications between interconnection platform 103 and the cloud service 124A network.

Although illustrated as a separate virtual circuit 127B, virtual circuit 127B may represent an extension of virtual circuit 127A (e.g., a Virtual Local Area Network (VLAN) or an Internet Protocol-Virtual Private Network (IP-VPN) shared in common), thereby enabling enterprise network 118 to exchange data with selected second cloud service 124B as well as with first cloud service 124A.

DR manager 140 may then copy the code and state from the containers of the first cloud service, e.g., the current container state of a container with its configuration along with an application or service running inside the container, from containers 126A-N of cloud service 124A, while DR manager 140 provisions DR infrastructure layers 144 in containers of the selected second cloud service, e.g., in containers 129A-N of cloud service 124B. DR manager 140 may then communicate the code and state it had copied from containers 126A-N of cloud service 124A to containers 129A-N of the newly provisioned DR infrastructure layers 144 of cloud service 124B. The applications, microservices, functions, processes, and instructions that had been executing on containers 126A-N of cloud service 124A may then resume executing on containers 129A-N of cloud service 124B, in containers that may have the same state and configuration as the corresponding containers from the first cloud service. Containers 129A-N of cloud service 124B may thus function as replicated copies of the original containers 126A-N of the initial cloud service 124A.

Provisioning or implementing DR infrastructure interface layer 142 may involve DR manager 140 installing instances of application code and data for a DR infrastructure interface layer on orchestration engine 106. In addition, DR manager 140 may configure networking platform 108 to direct service requests 130 from enterprise network 118 to the DR infrastructure interface layer 142. For example, DR manager 140 may configure a router 110A to direct service requests 130 sourced by enterprise network 118 and addressed to or destined for an endpoint of cloud service 124A (e.g., as indicated by host/domain URIs for the service requests and/or by a destination IP address for the service requests that indicates a host within subnets 128) to DR infrastructure layer 142. In some cases, DR manager 140 may configure a virtual routing and forwarding instance (VRF) or other virtual router of router 110A to direct all traffic, including service requests 130, on virtual circuit 127A and destined for subnets 128 to DR infrastructure interface layer 142. Networking platform 108 may intercept the service requests 130 from virtual circuit 127A and direct the service requests 130 to DR infrastructure interface layer 142. In various examples, DR manager 140 may update routes to the containers 126 of the first cloud service 124A with routes to the containers 129 of the DR infrastructure layers 144 in a routing table of the orchestration engine 106, subsequent to communicating the code and state to the DR infrastructure layers 144 in the containers 129 of the second cloud service 124B.

Each of service requests 130 may represent an HTTP Request that, e.g., includes a JavaScript Object Notation (JSON) or XML, body that specifies parameters defined for a RESTful API endpoint exposed by the DR infrastructure interface layer 142 (and by the interface of the enterprise application originally executing on cloud service 124 on which the DR infrastructure interface layer 142 is based).

DR infrastructure interface layer 142 may queue service requests 130 until DR manager 140 determines DR infrastructure layers 144 are operational to handle service requests 130, at which time DR infrastructure interface layer 142 may output service requests 132 (which are substantively identical to respective service requests 130) to the cloud service 124B operating as a backup/DR cloud service for failed cloud service 124A. DR infrastructure interface layer 142 may inject service requests 132 on DR virtual circuit 127B to cloud service 124B. To enable injection of service requests 132 in this manner, DR manager 140 may configure network platform 108 to receive data traffic from DR infrastructure interface layer 142 and forward the data traffic to the requisite destination in cloud service 124B as indicated in service requests 132. In some cases, networking platform 108 may perform network address translation (NAT) to cause service requests 132 to be forwarding by networking platform 108 to subnet 128B via DR virtual circuit 127B.

Provisioning DR infrastructure layers 144 in containers of the selected second cloud service may involve DR manager 140 installing application code and data on a requisite number of selected containers in the selected second cloud service with a mapped layout and other features replicated from the containers of the first cloud service and with a virtual circuit connection to DR infrastructure interface layer 142.

DR manager 140 may map the layout of the entire network of the initial cloud service 124A, and provision the DR infrastructure layers 144 with the same network layout in the selected second cloud service 124B. DR manager 140 may set up the DR infrastructure layers 144 in the second cloud service 124B with all of the same functions, features, and topology of the initial cloud service 124A. This may include DR manager 140 replicating a template-driven workflow, virtual machines (VMs), images, gateways, forwarding engines, libraries, and any other salient features of initial cloud service 124A.

DR manager 140 may manage setup of various DR infrastructure layers 144 of a DR infrastructure at the selected backup cloud service 124B selected to host the DR infrastructure back-end. The temporary DR infrastructure interface layer 142 may in some cases act as a virtual cloud between the initial cloud service 124A and the second cloud service 124B, built on top of orchestration engine 106 of cloud exchange 102. DR infrastructure layers 144 may include an interface layer, a network layer, a compute layer, and a storage layer implemented in containers in the selected second cloud service 124B, as described further below with respect to FIG. 5.

For example, the customer may initially operate a data storage service based in containers in a cloud service provided by a specific cloud service vendor in a specific region. When cloud exchange 102 detects a disaster indication and performs a DR process, cloud exchange 102 moves the functions and state of the initial data storage service to a new set of containers in a new cloud service, which may be in a second region and/or provided by a second cloud service provider. Cloud exchange 102 may coordinate inter-container communications to move code and state between containers, including images of executing containers, complete with mid-process images of processes and other pending state that are running inside the containers, e.g., a NoSQL data store for the customer's data storage service. Cloud exchange 102 may initially hold the pending state in an in-memory data store or other memory or data resource at the first cloud service while cloud exchange 102 progresses through a read or upload of the code and state.

To implement communication between containers of the initial cloud service, DR manager 140, and the selected second cloud service, orchestration engine 106 of cloud exchange 102 may register some or all of the containers in the initial cloud service 124A and assign each container a container identifier for identifying the container, and a network address for identifying a host executing the container. The container registration data for a selected container, including a network address for the container and a container identifier for the container, may also be referred to as a registration handle. Using the container registration data, orchestration engine 106 may facilitate inter-container communications and DR capabilities to enterprise 116.

In one example, container 126A may generate data for consumption by an application executing on container 126A, after orchestration engine 106 has initiated a DR process. DR manager 140 reads that data, the code for that application, and other state such as processes and instruction pointers involved in execution of the application, from container 126A in association with a container identifier and a network address of container 126A via Layer 2 and/or Layer 3 (L2/L3) communication from cloud service 124A via routers 110 of networking platform 108. DR manager 140 stores that data and other state and that code from container 126A in association with the container identifier and the network address of container 126A, at least until after a DR infrastructure layers 144 have been provisioned and are up and running at the selected second cloud service.

As part of DR manager 140 provisioning the DR infrastructure layers 144 and getting the DR infrastructure layers 144 up and running at the selected second cloud service 124B, DR manager 140 communicates the data and other state and the application code from container 126A to one of the containers of the second cloud service 124B, e.g., to container 129A. DR manager 140 may effectively replicate the first container 126A from the first cloud service 124A in the second container 129A of the second cloud service 124B. DR manager 140 may associate the container identifier and the network address of the first container 126A of the first cloud service 124A with a container identifier and a network address of the second container 129A of the second cloud service 124B, communicate code and state from the first container 126A to the second container 129A based on the association. DR manager 140 may subsequently redirect cloud service traffic in the form of communications and application flows addressed to a URL or other URI for resources at the first container 126A to the second container 129A in the DR infrastructure layers 144.

For example, an API gateway that receives application requests for enterprise 116 may be configured to redirect application traffic from container 126A at first cloud service 124A to container 129A at second cloud service 124B in response to the redirect information provided by DR manager 140 of orchestration engine 106. As another example, routers 110 of networking platform 108 may be configured to redirect application traffic from container 126A at first cloud service 124A to container 129A at second cloud service 124B. For instance, router 110A may be configured to send application traffic addressed to subnet 128A via DR virtual circuit 127B to subnet 128B of cloud service 124B. In some cases, router 110A or a NAT device of networking platform 108 may translate destination addresses for the application from subnet 128A to subnet 128B. In some cases, a networking platform 108 or an API gateway is configured to rewrite a URI for application traffic sent to cloud service 124A to instead be directed to cloud service 124B.

In this way, external resources (such as those of enterprise network 118) can continue interacting with the resources originally hosted at first container 126A and now hosted at second container 129A in a DR infrastructure without having to be notified to address those interactions to a new URI or other host network address. Orchestration engine 106 may thus coordinate the operations of networking platform 108 such that routers 110 may forward communications addressed to container 126A instead to cloud service 124B, where they may be directed to the host executing container 129A of the DR infrastructure layers 144 within cloud service 124B, such that container 129A functions as a replicated substitute for container 126A. If there are containers in the initial cloud service 124A that have not yet been copied, or fully copied, by DR manager 140 when the DR infrastructure layers 144 are up and running at the second cloud service 124B, DR manager 140 may copy or continue copying the code and state, or the remaining code and state, from those containers of the initial cloud service 124A to containers of the DR infrastructure at the second cloud service 124B.

Orchestration engine 106 may thus perform a DR process on containerized applications without requiring any active effort or management of the DR process by a customer or user. In some cases, the DR process may be entirely transparent to enterprise 116, for instance. Orchestration engine 106 may cause the replicated containers of the DR infrastructure at the second cloud service to resume operations of the original containers, including resuming pending operations in "mid-stream" or from the complete set of pending processes, instruction pointers, and other mid-operation state of the original containers as locked and copied in response to the initial disruption. End users of the customer's services may thus continue interacting with those services with little or no interruption or change in user experience, regardless of the shift in the operations from one cloud service to another, and despite the disaster or other disruption affecting the original cloud service.

In some examples, enterprise 116 may purchase service licenses for cloud services 124 from CSPs 122. In some examples, each service license may grant enterprise 116 permission to register and deploy a maximum number of containers on the cloud service provided by the CSP. For example, enterprise 116 may purchase a license to deploy fifty containers on cloud service 124A, and to connect to those containers on cloud service 124A via a VLAN implementing virtual circuit 127A. The terms of the license may also include license for deployment of a similar fifty containers on one or more other available cloud services via a VLAN implementing virtual circuit 127B for purposes of a DR process in the event of a qualifying disruption that triggers a DR process. The other available cloud services may, for example, be cloud services in other regions provided by the same cloud service provider as the primary cloud service, or may be provided by other cloud service providers. Orchestration engine 106 may register the licenses enterprise 116 has to deploy the selected numbers of containers in each cloud service, in association with information for a customer account, and may perform a DR process in the context of deploying, creating, and managing up to the selected numbers of containers in each of the involved cloud services 124, potentially under different license terms for normal use and for temporary use in a DR process if needed.

In some instances, a cloud exchange may enable a customer or other user, such as enterprise 116 or an agent thereof, to initially or from time to time establish DR configuration settings, such as conditions or criteria qualifying as a disruption to trigger a DR process, via customer portal 104. The user-selected DR configuration settings may be associated with the user's customer account with cloud exchange 102, and may be entered or stored as DR configuration setting inputs to DR manager 140. DR manager 140 may expose the DR configuration setting options to a customer and receive the user selection inputs via an API. DR manager 140 may provide different DR configuration settings and DR workflow options for different DR scenarios. A DR workflow may include a set of steps or operations that define an order in which the various infrastructure layers of DR infrastructure layers 144 are brought up by DR manager 140. For example, a customer may configure a DR workflow to first bring up a storage layer for DR infrastructure layers 144, then a compute layer, then a network layer, and finally an interface layer in the DR infrastructure in the backup cloud service (separate from the temporary DR interface layer 142 of orchestration engine 106) to handle service requests from enterprise applications.

The DR configuration settings may include settings and rules for when or under what conditions DR manager 140 is to set up and tear down a DR infrastructure at a backup cloud service. DR manager 140 may also expose ongoing information about its activities on the customer's account to the customer to enable all DR process activity to be completely transparent to the customer, e.g., in a cloud exchange dashboard provided to interfaces provided to the customer, such as website portal 112 displayed at enterprise workstations 120.

DR manager 140 may store and track DR configuration settings for a potentially large number of customer accounts, potentially in association with other customer account information or customer account settings stored or tracked by other features of orchestration engine 106. DR manager 140 of orchestration engine 106 may then initiate and perform DR processes in accordance with the customer-selected configuration settings. This includes DR manager 140 performing the on-demand setup of a DR infrastructure, including DR infrastructure interface layer 142 and DR infrastructure layers 144 in accordance with the user-selected DR configuration settings associated with the customer account for the cloud service affected by the triggering disruption.

The cloud exchange thus provides on-demand setup of infrastructure for DR in the cloud. The cloud exchange detects failure or disruption of an initial cloud service, dynamically selects a second cloud service separate from the failed initial cloud service, and triggers set-up at the second cloud service of a complete DR infrastructure or DR environment that includes different DR infrastructure layers for different functions. The first layer of the DR infrastructure to be set up is an interface layer at the cloud exchange that functions as a virtual DR cloud service to copy and maintain all current operations in the initial cloud service, as soon as the cloud exchange detects a disaster state trigger, or other indication of a disruption in the initial cloud service.

The disruption in the initial cloud service may be caused by a power outage, a malware attack, a physical loss of one or more network nodes, a sudden overload by increased levels of application traffic or overwhelming increase in resource demand, or any other cause of disruption of the cloud service. The indication of the disruption may take the form of any type of detection of the aforementioned examples of disruptions via network or cloud service monitoring systems. The orchestration engine may also enable a customer to transmit a trigger to launch the DR process, potentially based on the customer's own internal functions or detection rules, or manually, such as in case of a human-in-the-loop confirmation of a disruption indication in DR monitoring tools exposed to the customer. The initial detection of the indication of the disruption in the initial cloud service and responsive initiation of the DR process may be analogized to a circuit breaker that may ensure that no data or operations of the first cloud service are lost in the immediate aftermath of an initial disaster or disruption of the first cloud service. That is, as soon as cloud exchange 102 detects the disruption, the DR infrastructure interface layer 142 at the cloud exchange 102 begins copying all current or pending requests, instructions, processes, and other pending state (e.g., including all incoming data and current state in the initial cloud service) from the containers of the first cloud service in a queue, during the process of the cloud exchange DR manager setting up the other layers of the DR infrastructure in the dynamically selected second cloud service.

The cloud exchange DR manager continues to set up the remaining layers of the DR infrastructure and initiate their functioning, eventually setting up the complete DR infrastructure in containers in the selected second cloud service. DR manager 140 sets up the DR infrastructure layers in pre-existing containers already executing and active at the second cloud service, to facilitate rapid replication of the original containers. DR manager 140 ensures that the code and pending state from the containers of the first cloud service are delivered to the DR infrastructure layers at the new cloud service for ongoing processing as the containers of the infrastructure layers become available to receive the code and state from the initial cloud service and to take over functions of the initial cloud service, such that all functions of the initial cloud service seamlessly resume functioning, including resuming execution of applications and microservices from mid-process where applicable, in the new cloud service, without failure of the functions of those applications and microservices. The containers of the DR infrastructure layers thus serve as replicated copies of the containers of the initial cloud service.

A system in accordance with example techniques of this disclosure may enable a cloud exchange to perform a DR process on containers across different private or public cloud services or networks. Such a system in accordance with example techniques of this disclosure may detect a qualifying disruption to a cloud service and respond by implementing a DR process. Such a system in accordance with example techniques of this disclosure, e.g., a DR manager of an orchestration engine of a cloud exchange, may provision a DR infrastructure interface layer at the orchestration manager of the cloud exchange. A system in accordance with example techniques of this disclosure, e.g., a DR manager, may copy the code and state from the containers of the initial cloud service, while the DR manager provisions a DR infrastructure on containers of a selected second cloud service. The copied state may include any data, instruction pointers, pending requests on microservices, and any other state for one or more applications, one or more microservices, a runtime, and any other resources executing in the containers.

Once the DR infrastructure is up and running on the containers of the second cloud service, a system of this disclosure, e.g., a DR infrastructure interface layer, may push or communicate service requests 132 (and in some cases the code and state from the DR infrastructure interface layer) to the containers of the DR infrastructure layers at the second cloud service. A system of this disclosure, e.g., an orchestration engine, may then cause application traffic bound for the network addresses of the original containers in the first cloud service to be redirected to the equivalent containers with the replicated code and state in the DR infrastructure in the second cloud service. The DR process performed by the orchestration engine of the cloud exchange thus provides for the applications, microservices, and other functions to resume operation on the containers of the DR infrastructure in the second cloud service, despite the disruption to the initial cloud service. Systems of this disclosure may thus enable cloud services to maintain more effective service to their customers by minimizing or remedying interruptions to their cloud-based operations due to disasters or other disruptions to their cloud service.

Figure 2:
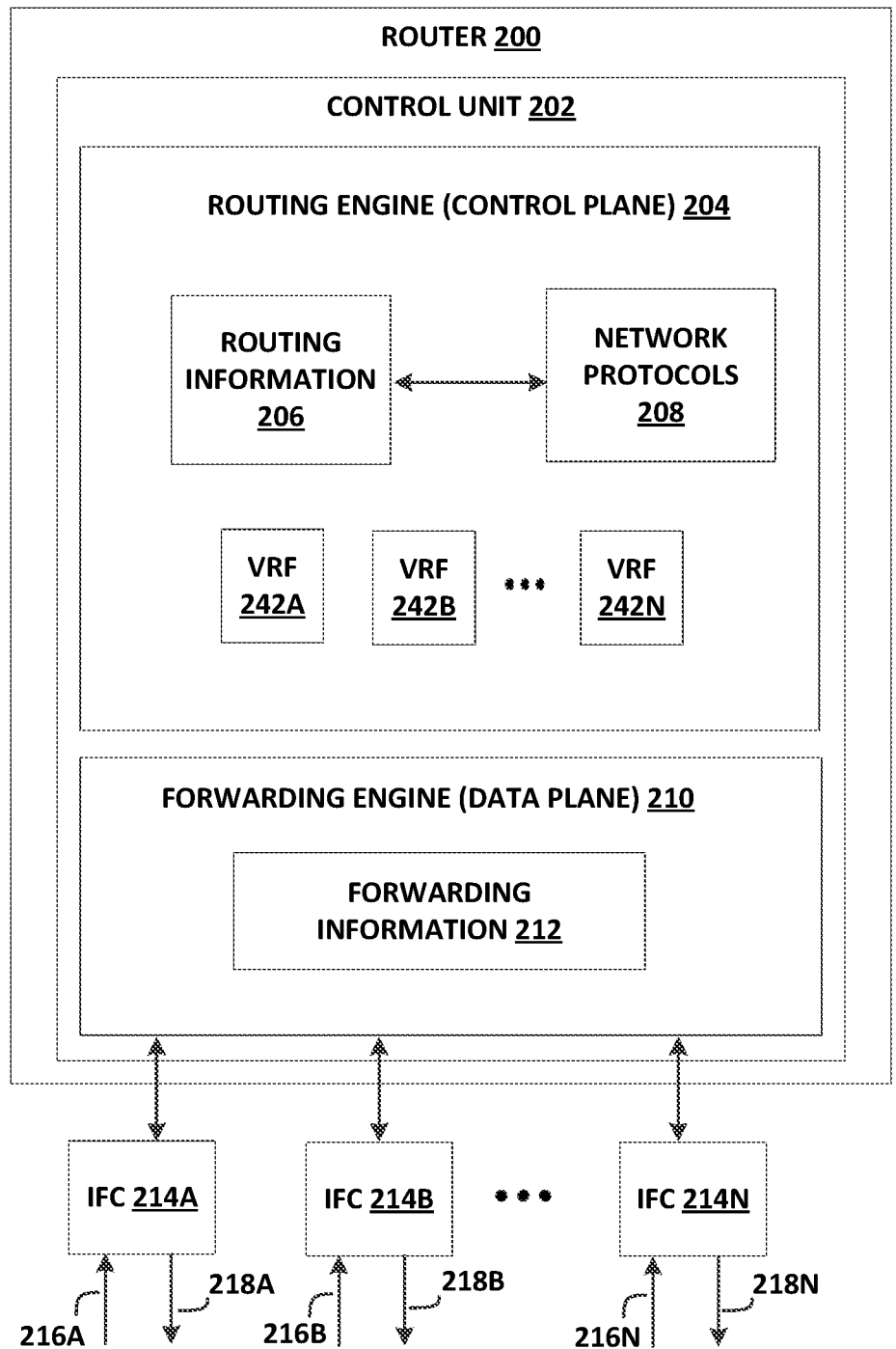
FIG. 2 is a block diagram illustrating an example router in accordance with example techniques of this disclosure.

FIG. 2 is a block diagram illustrating an example router within a cloud exchange in accordance with one or more techniques of the disclosure. In general, router 200 may operate substantially similarly to routers 110A-110N in FIG. 1. In this example, router 200 includes interface cards 214A-214N ("IFCs 214") that may receive packets via incoming links 216A-216N ("incoming links 216") and send packets via outbound links 218A-218N ("outbound links 218"). IFCs 214 are typically coupled to links 216, 218 via a number of interface ports. Router 200 also includes a control unit 202 that determines routes of received packets and forwards the packets accordingly via IFCs 214. Routing engine 204 also includes virtual routing function units (VRFs) 242A, 242B, . . . 242N ("VRFs 242"), which may be representative of any number of VRFs within the limits of engineering. Each VRF 242 may be implemented on the hardware of router 200 but virtualize the routing and forwarding functions of router 200.

Each VRF 242 may be associated with or dedicated to a different cloud service 124, and may be associated for interconnecting a specific cloud service 124 with a specific enterprise 116 or other customer or user. VRFs 242 may be configured for interconnecting respective cloud service 124 with specific enterprises 116 or other customers or users by cloud exchange 102. VRFs 242 may be configured with routes for layer 3 subnets that include host addresses identified by URLs or other URIs or network addresses that uniquely identify the microservices or other applications in the containers for DNS purposes.

DR manager 140 may, at or near the conclusion of a DR process, implement a changeover of VRFs 242 in router 200, e.g., in networking platform 108 of cloud exchange 102, by modifying a mapping table in routing engine 204 to reassign the application flow for a first VRF 242A configured to direct traffic to the initial cloud service, to a second VRF 242B configured to direct traffic to the DR infrastructure layers at the second cloud service. DR manager 140 may configure VRF 242B with a network address table associating the URLs or other network addresses of the microservices and other applications from the containers of the initial cloud service to the network addresses and container identifiers of the replicated copies of those microservices and other applications installed and executing on the replicated containers of the DR infrastructure layers of the second cloud service. Traffic addressed to the URLs or other network addresses of the microservices and other applications from the containers of the original cloud service are thus automatically directed to the replicated containers of the DR infrastructure layers at the second cloud service, without the URLs or other network addresses being changed, and without the packets of the application traffic needing to be rewritten.

Control unit 202 may comprise a routing engine 204 and a packet forwarding engine 210. Routing engine 204 operates as the control plane for router 200 and includes an operating system that provides a multi-tasking operating environment for execution of a number of concurrent processes. Routing engine 204, for example, may execute software instructions to implement one or more network protocols 208. For example, network protocols 208 may include one or more routing and switching protocols, such as Border Gateway Protocol (BGP), Multi-protocol Label Switching (MPLS), Virtual Private LAN Services (VPLS), Ethernet Virtual Private Networking (EVPN), or Provider Backbone Bridging EVPN (PBB-EVPN) for exchanging routing information with other routing devices and for updating routing information 206. Routing information 206 may describe a topology of the cloud exchange in which router 200 resides, and may also include routes through the shared trees in the computer network. Routing information 206 describes various routes within the computer network, and the appropriate next hops for each route, i.e., the neighboring routing devices along each of the routes. Routing engine 204 analyzes stored routing information 206 and generates forwarding information 212 for forwarding engine 210. Forwarding information 212 may associate, for example, network destinations for certain multicast groups with specific next hops and corresponding IFCs 214 and physical output ports for output links 218. Forwarding information 212 may be a radix tree programmed into dedicated forwarding chips, a series of tables, a complex database, a link list, a radix tree, a database, a flat file, or any of various other data structures.

Forwarding information 212 may include lookup structures. Lookup structures may, given a key, such as an address, provide one or more values. In some examples, the one or more values may be one or more next hops. A next hop may be implemented as microcode, which, when executed, performs one or more operations. One or more next hops may be "chained," such that a set of chained next hops performs a set of operations for respective different next hops when executed. Examples of such operations may include applying one or more services to a packet, dropping a packet, and/or forwarding a packet using an interface identified by the one or more next hops. Router 200 may be configured, at least in part, by interconnection platform 103 as shown in FIG. 1, including by DR manager 140, such as by DR manager 140 updating the network addresses and container identifiers associated with URLs in a mapping table for VRFs 242 to re-direct application traffic to a DR infrastructure back-end.

In accordance with techniques of this disclosure, router 200 may operate as one of routers 110 in the example of FIG. 1. In one example, routing engine 204 may use routing protocols 208 to exchange routing information with each of a plurality of cloud services (e.g., cloud services 124) and store learned routes through cloud services 124 in routing information 206. Forwarding engine 210 may associate various subnets, such as subnets 128A and 128B, with various cloud services, such as cloud services 124A and 124B, respectively, and store this information in forwarding information 212. Router 200 may receive L2/L3 data communications, which may, for example, originate from the Internet 114 and be addressed to a microservice or other application initially executing on container 126A, along incoming links 216. After DR manager 140 has reconfigured router 200 in accordance with a DR process, control unit 202 may parse the data communication for a network address (e.g., IP address) for a microservice or other application initially executing on container 126A and, based on updates to forwarding information 212 by DR manager 140, forward the data communication toward subnet 128B, wherein container 129A may receive the forwarded communication. DR manager 140 may configure control unit 202 to address data communications to unique container identifiers associated with a network address for respective containers 129 at the second cloud service 124B. Forwarding engine 210 may transmit the data communication along outbound links 218 to subnet 128B within cloud service 124B, wherein container 129A may receive the data communication.

Accordingly, it may be seen that a router within a cloud exchange implemented according to techniques of this disclosure may receive a data communication addressed to a first container within a first cloud service and transmit that data communication to a second container in a second cloud service. Such a router may allow a customer or other user of a cloud service to maintain more effective service to their own customers or users by rapidly remedying disruptions to a first cloud service and to microservices or other applications provided by containers of the first cloud service.

The architecture of router 200 illustrated in FIG. 2 is shown for example purposes only. Techniques as set forth in this disclosure may be implemented in the example router of FIG. 2 as well as other types of routers not described specifically herein. In other examples, routers enabled to function in accordance with this disclosure may be configured in a variety of ways. In some examples, some of the functionality of control unit 202 may be distributed within IFCs 214. In some examples, control unit 202 may comprise a plurality of packet forwarding engines. Nothing in this disclosure should be construed so as to limit techniques of this disclosure to the example architecture illustrated by FIG. 2.

Figure 3:
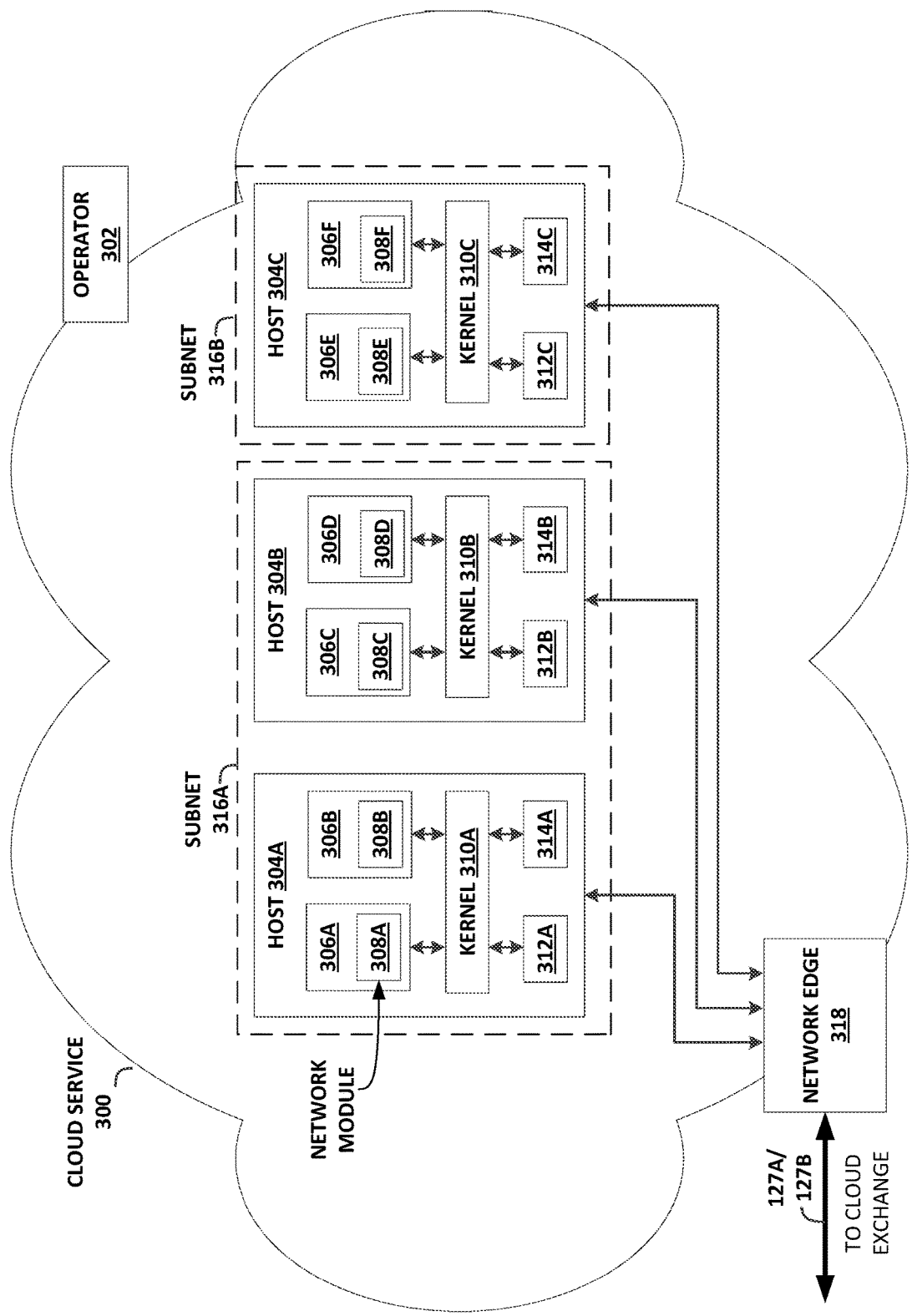
FIG. 3 is a block diagram illustrating an example private network in accordance with example techniques of this disclosure.

FIG. 3 is a block diagram illustrating an example cloud service configured in accordance with example techniques of this disclosure. In the example of FIG. 3, operator 302 may operate a cloud service 300 possessing computing resources by which one or more customers may execute a plurality of applications and microservices. In some examples, operator 302 may be an enterprise, such as enterprise 116 of FIG. 1. In some examples, operator 302 may be a CSP, such as CSP 122A or CSP 122B of FIG. 1. In some examples, cloud service 300 may be an implementation of cloud service 124A and/or 124B of FIG. 1.

Cloud service 300 may comprise a plurality of hosts 304A, 304B, and 304C (collectively, "hosts 304"). In some examples, a host may be a server executing in cloud service 300 and connected to a network of cloud service 300. In other examples, one or more hosts may be one or more virtual machines executed on one or more servers running in cloud service 300. Each of hosts 304 may have an IP address such that the host may be identified in cloud service 300. In some examples, a plurality of hosts may possess a plurality of IP addresses falling within an IP subnet, such as IP subnets 316A, 316B. Hosts 304 may communicate with network edge device 318, which may represent a router or L3 switch. Network edge device 318 may connect along virtual circuit 127A/virtual circuit 127B to a cloud exchange, such as cloud exchange 102 of FIG. 1. In some examples, network edge router 318 may operate to forward messages between hosts 304 and cloud exchange 102.

Each host may execute one or more containers. In the example of FIG. 3, host 304A is configured to execute containers 306A and 306B, host 306B is configured to execute containers 306C and 306D, and host 304C is configured to execute containers 306E and 306F (collectively, "containers 306"). Containers 306 may operate in a similar fashion as and may represent any of containers 125, 126, 129 of FIG. 1. Each host 304 may implement a specific kernel instance 310, common libraries 312, and kernel specific libraries 314. Each of the containers executed within a particular host share a kernel 310 and common libraries 312 (e.g., containers 306A and 306B of host 304A share kernel 310A and common libraries 312A), and execute on top of the common kernel 310. In one example, any of hosts 304 may execute instances of the Docker container application for a Linux operating system kernel, which in such examples are represented by containers 306 and kernel 310, respectively.

In some examples, each of the containers within the host may share the IP address of the host. In some examples, each container may be uniquely identified by a container ID or port ID. In some examples, the port ID of a container identifies a Transmission Control Protocol (TCP) port or a User Datagram Protocol (UDP) port. In some examples corresponding to FIG. 3, containers 306A and 306B may share IP address 192.168.1.125 with host 304A. In some of these examples, container 306A may be associated with port ID 5001 for the host 304A while container 306B may be associated with port ID 5002. In some examples, host 304A may forward traffic destined for TCP port 5001 to container 306A and forward traffic destined for TCP port 5002 to container 306B. According to example techniques of this disclosure, each of containers 306 may possess a network module 308, as described herein, to allow the container to communicate with cloud exchange 102. Orchestration engine 106 may communicate data for the network modules 308 to containers 306 to enable such responsive interaction of containers 306 with cloud exchange 102, and with DR manager 140 in particular.

In some examples, an enterprise, such as enterprise 116 of FIG. 1, may purchase or otherwise contract for a number of containers to be deployed within a cloud service, such as cloud service 124A. In some examples, enterprise 116 may create at least one application, such as a microservice. Each of containers 306 may provide an execution environment for applications. In some examples, each of containers 306 may provide an execution environment for at least one unique application or microservice, while in other examples, each of containers 306 may provide redundant access to at least one application or microservice. In some examples, each customer of cloud service 300 may access a single container (e.g., container 306A). In some examples, a customer may have access to a plurality of containers (e.g., containers 306A, 306B, and 306C). In some examples, each container within a subnet may provide a particular suite of applications or microservices. In some examples, each container within a subnet may provide access to cloud service 300 to a particular customer or group of customers.

According to example techniques of this disclosure, containers 306 include respective network modules 308 extended to obtain and send, to a cloud exchange, container registration data including, e.g., network data and container identification data for the container. For example, container 306A includes network module 308A that obtains a network address for host 304A in subnet 316A and further obtains a container identifier for container 306A, the container identifier usable by the kernel 310A to identify container 306A from other containers executing on host 307A, such as container 306B. In some cases, the container identifier is a unique container identifier that distinguishes container 306A from all other containers in cloud service 300. In some cases, the container identifier is a networking port, such as a TCP or UDP port, that distinguishes container 306A from other containers executing on the host. In some cases, the container identification data includes both a unique container identifier and a networking port. In any of these cases, a unique container identifier and/or a networking port assigned to a particular container may be referred to generally as a container identifier.

Network modules 308 self-register the container registration data by invoking APIs 105 of cloud exchange 102 to send the container registration data. In this way, interconnection platform 103 of cloud exchange 102 receives container registration data by which interconnection platform 103 may, via virtual circuit 127A/127B, send data communications to the corresponding container 306. For example, with respect to container 306A, network module 308A may invoke APIs 105, via a virtual circuit 127A/127B with cloud exchange 102, to send the container registration data for container 306A to interconnection platform 103.

Interconnection platform 103 may store container registration data for containers 306. Interconnection platform 103 may associate multiple containers in an association and send each container in the association container registration data for other containers in the association. As a result, a container in an association may use the container registration data to send data communications via a cloud exchange to another container in the association that is located in a different cloud service coupled to the cloud exchange.

According to example techniques of this disclosure, container 306A within cloud service 300 may communicate with a DR infrastructure interface layer 142, and/or with a container within another cloud service connected to cloud exchange 102, such as container 129A within cloud service 124B. In this example, based on container registration data received from interconnection platform 103, container 306A may generate a data communication having a container identifier (e.g., a port) indicating the destination container (e.g., container 129A) and a network address (e.g., an IP address within an enterprise network 116 subnet) for a host that executes the destination container. Container 306A may output this data communication for transmission outside cloud service 300 via virtual circuit 127A/127B to routers 110 of cloud exchange 102. As described above, orchestration engine 106 may operate networking platform 108 to forward the communication to the destination subnet of the appropriate cloud service (e.g., to subnet 128B of cloud service 124B). Cloud service 124B may direct the data communication to container 129A within subnet 128B.

Orchestration engine 102 may also receive a request or other data communication from the Internet addressed to container 126A after a DR process has commenced. If the DR process has been initiated but the DR infrastructure 144 is not yet provisioned and executing on the second cloud service, DR infrastructure interface layer 142 may hold the data communication in a queue. Once the DR infrastructure 144 is provisioned and executing on the second cloud service, DR infrastructure interface layer 142 may, in response, release data communications from the queue to routers 110 of cloud exchange 102. Cloud exchange 102 may include networking platform 108 to redirect the second data communication to cloud service 300. Features of routers 110, e.g., VRF 242B, may forward the data communications via virtual circuit 127B to the replicated containers of DR infrastructure 144 corresponding to the originally addressed containers and having the same network addresses as the originally addressed containers from the initial or first cloud service 124A.

Network edge device 318 may receive the data communications from virtual circuit 127B and forward the data communication to the host having the IP address identified by the data communication (e.g., host 304A). In some examples, the destination IP address of second data communication may specify a TCP/UDP port of host 304A. Host 304A may pass the second data communication to the container having a port ID matching the TCP/UDP port of the destination IP address. Thus, it may be seen that a cloud service configured by a DR manager 140 implemented according to example techniques of this disclosure may enable communications to be re-directed from a first container within a first cloud service connected to a cloud exchange to a second container configured to function as part of a DR infrastructure within a second cloud service connected to the cloud exchange.

The architecture of cloud service 300 illustrated in FIG. 3 is shown for example purposes only. Example techniques of this disclosure may be implemented in the example cloud service of FIG. 3, as well as other types of cloud services not described specifically herein. In other examples, cloud service 300 may be configured in a variety of ways. In some examples, cloud service 300 may implement various APIs, operating systems, hardware, or software that share a common communication protocol with the cloud exchange. In some examples, each cloud service of the cloud exchange may use a different communication protocol to exchange data with the cloud exchange, and the cloud exchange may act to facilitate or translate communications between cloud services using different communication protocols. Nothing in this disclosure should be construed so as to limit techniques of this disclosure to the example architecture illustrated by FIG. 3.

Figure 4:
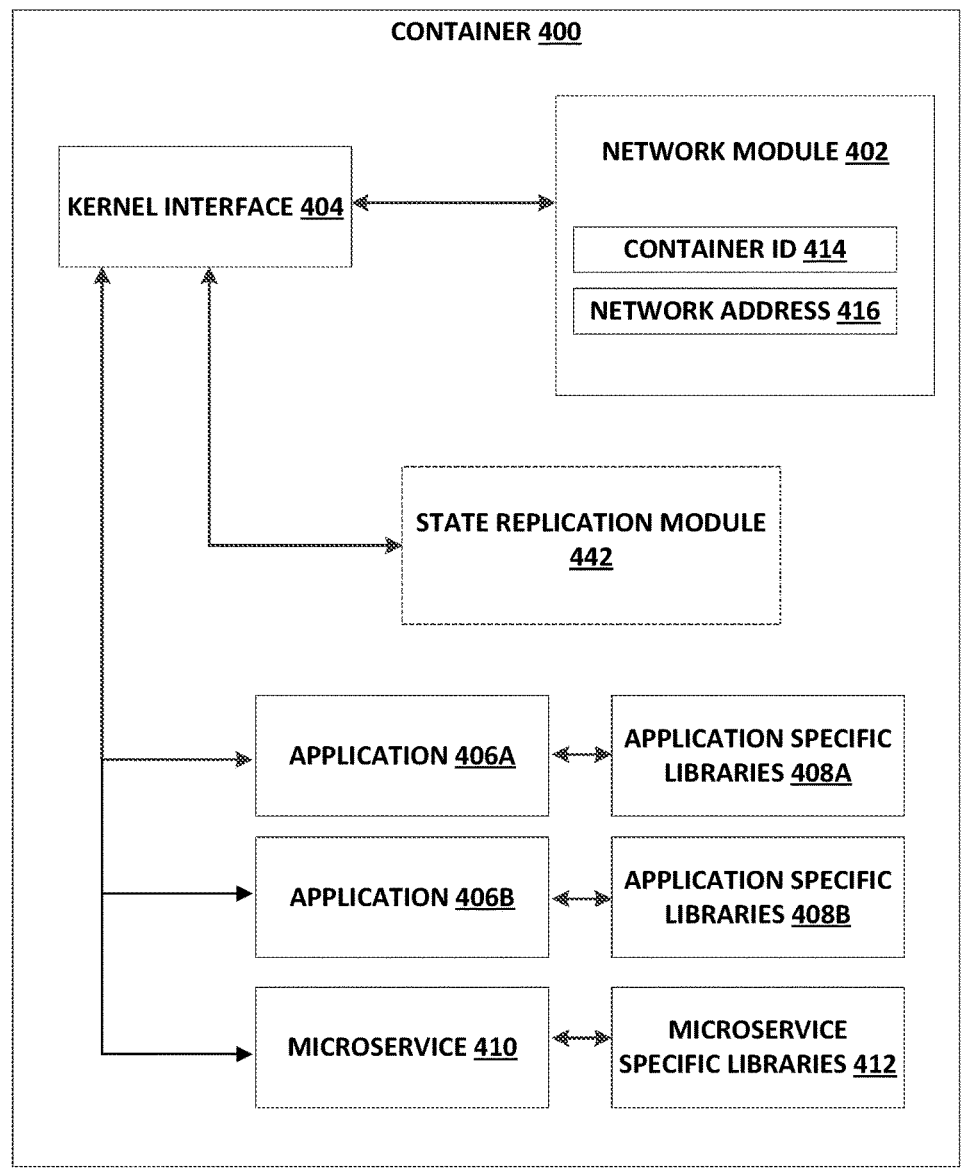
FIG. 4 is a block diagram illustrating an example container in accordance with example techniques of this disclosure.

FIG. 4 is a block diagram illustrating an example container according to example techniques of this disclosure. Container 400 may be a virtualized container such as those provided by the Docker container technology for the Linux operating system. In some examples, container 400 may share an operating system and common libraries with other containers and the host kernel. In some examples, container 400 may send and receive data communications, control signals, and various other transmissions to and from the system kernel through kernel interface 404.

Container 400 includes state replication module 442. State replication module 442 may be installed on container 400 by orchestration engine 102 of FIG. 1. State replication module 442 may be implemented as a supplemental microservice or other software module that executes on container 400. State replication module 442 configures container 400 to be receptive to a DR process command from orchestration engine 106 (e.g., from DR manager 140) to replicate all code and state from container 400 and to transmit that replicated code and state to orchestration engine 106 (e.g., to DR manager 140) in response to receiving that replication command from orchestration engine 106 as part of a DR process.

In some examples, container 400 may use network module 402 in conjunction with kernel interface 404 to compose, send, and receive data to and from a network. For example, network module 402 may enable container 400 to communicate according to various networking protocols, such as Virtual Extensible LAN (VXLAN), IPVLAN, MACVLAN, VPLS, EVPN, or PBB-EVPN. According to example techniques of this disclosure, network module 402 may operate to self-register the corresponding container of a plurality of containers, operating within a plurality of networks coupled to a cloud exchange, with the cloud exchange to facilitate communications among the containers via the cloud exchange. Network module 402 includes several identifiers so that container 400 may be identified on a private network, such as a cloud service or enterprise network.

Container identifier 414 is a data field that uniquely identifies container 400 against other containers. In some examples, container identifier 414 is a port ID that corresponds to a TCP/UDP port of the host computer executing container 400. Host network address 416 is a data field that identifies the network address of the host on which container 400 executes. In some examples, host network address 416 may be an IP address. In various examples, host network address 416 may generally be a Uniform Resource Identifier (URI).

In some examples, container 400 is configured to execute at least one microservice 410 and associated microservice-specific libraries 412. In some examples, container 400 is configured to execute at least one application and associated application-specific libraries, such as application 406A and 406B and application-specific libraries 408A and 408B, respectively. Container 400 may provide the at least one microservices and applications to a customer for access through a cloud service. Because container 400 is virtualized and isolated from the system kernel and other containers, container 400 may provide a customer with safe and secure access to the at least one microservices and applications. In some examples, container 400 may be a container within a Microsoft Azure cloud service. In some of these examples, container 400 may provide a customer with an environment to execute a suite of applications. In some examples, container 400 may be a container within an Amazon Webservices cloud service. In some of these examples, container 400 may provide a customer with an environment to execute one or more microservices.

The architecture of container 400 illustrated in FIG. 4 is shown for example purposes only. Example techniques as set forth in this disclosure may be implemented in the example container of FIG. 4, as well as other types of containers not described specifically herein. In various examples, container 400 may be configured in a variety of ways. In some examples, container 400 may implement various APIs, one or more applications, one or more microservices, one or more databases or other data stores, one or more data storage resources, one or more networking resources, one or more other computing resources, and/or other resources. In some examples, container 400 may provide an operating environment for a single application or a single microservice. Nothing in this disclosure should be construed so as to limit techniques of this disclosure to the example architecture illustrated by FIG. 4.

Figure 5:
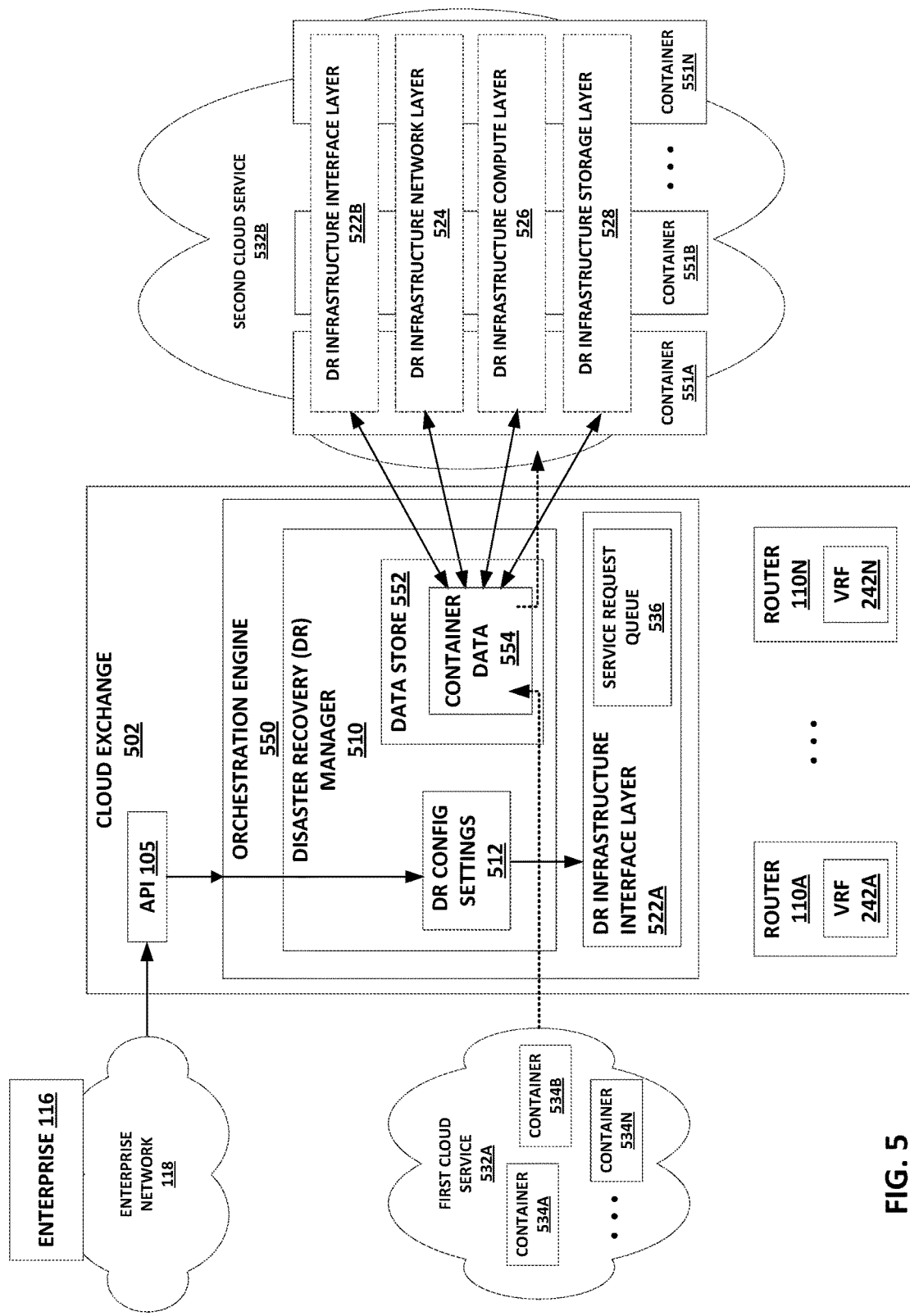
FIG. 5 is a block diagram illustrating an orchestration engine for a cloud exchange in accordance with example techniques of this disclosure.

FIG. 5 is a block diagram illustrating a cloud exchange with an orchestration engine that includes a DR manager 510 according to techniques described in this disclosure. Orchestration engine 550 may represent an example instance of orchestration engine 106 of FIG. 1. While FIG. 5 is described with reference to FIG. 1, FIG. 5 may apply generally to various techniques of this disclosure.

Orchestration engine 550 initially provisions a virtual circuit connection for enterprise network 118 via VRF 242A with first cloud service 532A which hosts containers 534A, 534B, . . . 534N ("containers 534"), some of which are licensed to enterprise 116 to execute applications on behalf of enterprise 116. Orchestration engine 550 receives, via APIs 105, DR configuration settings 512 from customers and other users such as enterprise 116 in association with cloud exchange accounts or licenses for those customers or users. Cloud exchange 502 is managed at least in part by an interconnection platform that includes orchestration engine 550. Orchestration engine 550 stores, to a database or other data store, the DR configuration settings 512. DR configuration settings 512 may include, e.g., criteria for qualifying disruptions to trigger initiation of a DR process by DR manager 510, protocols for how to select a second cloud service among available cloud services to host a DR infrastructure for a DR process, and designations of how many containers of the second cloud service to use to host the DR infrastructure for the DR process.

In some examples, DR configuration settings 512 may include configuration data for selecting a cloud service provider network to provide DR services orchestrated by orchestration engine 550 on behalf of enterprise 116. The configuration data may specify that the cloud service provider network to provide DR services is preferably colocated within a data center in which enterprise 116 is also colocated, where the data center is deployed by the cloud exchange provider and includes the cloud exchange. The configuration data may specify the cloud service provider network to provide DR services for a particular primary cloud service network. For example, the configuration data may specify that the cloud service provider network that provides second cloud service 532B is to be used by cloud exchange 502 to provide DR services for first cloud service 532A for enterprise 116.

Prior to or as part of a DR process, orchestration engine 550 may access container registration data for containers 534 of first cloud service 532A and for containers 551 of second cloud service 532B. The container registration data may include a respective container registration handle for each available container, where each container registration handle includes both a network address and a unique container identifier (potentially a port number) for the respective container. Orchestration engine 550 may use container registration data to extend network connectivity through the first cloud service 532A that includes a respective container 534N and address the container 534N directly via a virtual circuit 127A via VRF 242A by which first cloud service 532A communicates with cloud exchange 502 and, in some cases, other cloud services (e.g., cloud service 532B).

DR manager 510 monitors first cloud service 532A and detects a disruption that occurs to the nominal operation of first cloud service 532A and that meets conditions that qualify as a DR triggering disruption according to rules or protocols set in the user-selected DR configuration settings stored by DR manager 510. DR manager 510 may be considered to detect an indication of the disruption, where the indication is any monitoring sign or clue of the actual disruption that has occurred. Examples of DR triggering disruptions may include loss or significant degradation in connectivity between first cloud service 532A and enterprise network 118, an indication of failure of one or more of containers 534, and a notification from a cloud service provider for first cloud service 532A indicating a service disruption.

DR manager 510 responds to the indication of the disruption by provisioning a DR infrastructure interface layer 522A on orchestration engine 550, and provisioning DR infrastructure layers 522B, 524, 526, 528 on pre-existing containers 551A, 551B, . . . 551N ("containers 551") of a second cloud service 532B that DR manager 510 selects from among a plurality of available cloud services for hosting the DR infrastructure. DR manager 510 may rapidly place a hold on the state of containers 534 of first cloud service 532A and begin copying the code and state from containers 534 to data store 552 as container data 554, and re-directs application flow addressed to containers 534 to a temporary service request queue 536 in DR infrastructure interface layer 522A of orchestration engine 550, while DR manager 510 gets DR infrastructure layers 522B, 524, 526, 528 up and running on containers 551 of second cloud service 532B. For DR manager 510 to place a hold on and replicate the state of containers of containers 534 of first cloud service 532A, DR manager 510 may interface with state replication modules 442 previously installed on containers 534 by DR manager 510 and direct state replication modules 442 to preserve pending state in a local in-memory data grid, database, or other memory resource or data store in first cloud service 532A as needed while DR manager 510 rapidly reads the state. Data store 552 may represent a Redis data store in some examples. Container data 554 may include application code, state, and/or other data executed by or stored or loaded on containers. Container data 554 may include container registration data for one or more containers of cloud services 532A, 532B.

DR configuration settings 512 may include definitions for API endpoints for an interface layer of an application deployed by enterprise network 116 to first cloud service 532A. To provision DR infrastructure interface layer 522A, DR manager 510 may generate interface software to expose the API endpoints defined in DR configuration settings 512. DR configuration settings 512 may include definitions of interface layers for multiple different applications of enterprise 116 and/or definitions of interface layers for multiple different applications for corresponding enterprises. In this way, DR manager 510 may provide DR services for multiple different enterprise customers of the cloud exchange provider, and generate corresponding instances of DR infrastructure interface layer 522A to handle service requests for the different enterprise customers.

DR infrastructure layers 522B, 524, 526, 528 include a DR infrastructure interface layer 522B, DR infrastructure network layer 524, a DR infrastructure compute layer 526, and a DR infrastructure storage layer 528 in this example, which may perform interface/API, networking, computing, and storage functions, respectively. The DR infrastructure may include other layers and/or a subset of these representative layers in other examples. Each of DR infrastructure layers 522B, 524, 526, 528 may be executed on one or more of containers 551 of second cloud service 532B, and each of the containers 551 used for the DR infrastructure may be used for one or more of DR infrastructure layers 524, 526, 528. DR infrastructure layers 522B, 524, 526, 528 are an example implementation of DR infrastructure layers 144 of FIG. 1.

DR manager 510, which may be an implementation corresponding to DR manager 140 of FIG. 1, may modify routing information of VRFs 242 as part of a DR process to re-direct cloud service traffic such as application traffic flow from enterprise network 118 to DR infrastructure interface layer 522A. DR manager 510 may thus re-direct traffic addressed to the containers 534 of first cloud service 532A to DR infrastructure interface layer 522A, which may be executed on a host computing device of cloud exchange 502 and deployed by the cloud exchange 502 provider. Once DR manager 510 has received an indication that DR infrastructure interface layer 522B is operable to handle service requests from enterprise network 118, DR manager 510 may again modify routing information of VRFs 242 as part of the DR process to re-direct traffic addressed to the containers 534 of first cloud service 532A to corresponding replicated containers 551 of the selected second cloud service 532B.

Orchestration engine 550 may thus create an association from containers accessible to an enterprise or other user in a first cloud service to containers requisitioned for a dynamically provisioned, on-demand DR infrastructure in a second cloud service. Based on network addresses for containers and one or more IP subnets identified by one or more service keys, orchestration engine 550 may correlate the one or more service keys to the requisitioned containers executing at the second cloud service to associate the containers to the enterprise that provided the one or more service keys. In this way, the containers designated and used for the DR infrastructure are registered with orchestration engine 550 to the enterprise or other user.

Orchestration engine 550 may establish a new virtual circuit between the first cloud service and the second cloud service. Orchestration engine 550 may establish a new virtual circuit between enterprise network 118 and second cloud service 532B. Containers may provide their corresponding container registration data to orchestration engine 550 via the virtual circuit (e.g., a VLAN). DR manager 510 may be vendor-neutral in that the cloud exchange provider may implement DR manager 510 to interoperate with cloud services provided by any of a plurality of cloud service providers selectable by the enterprise.

Figure 6:
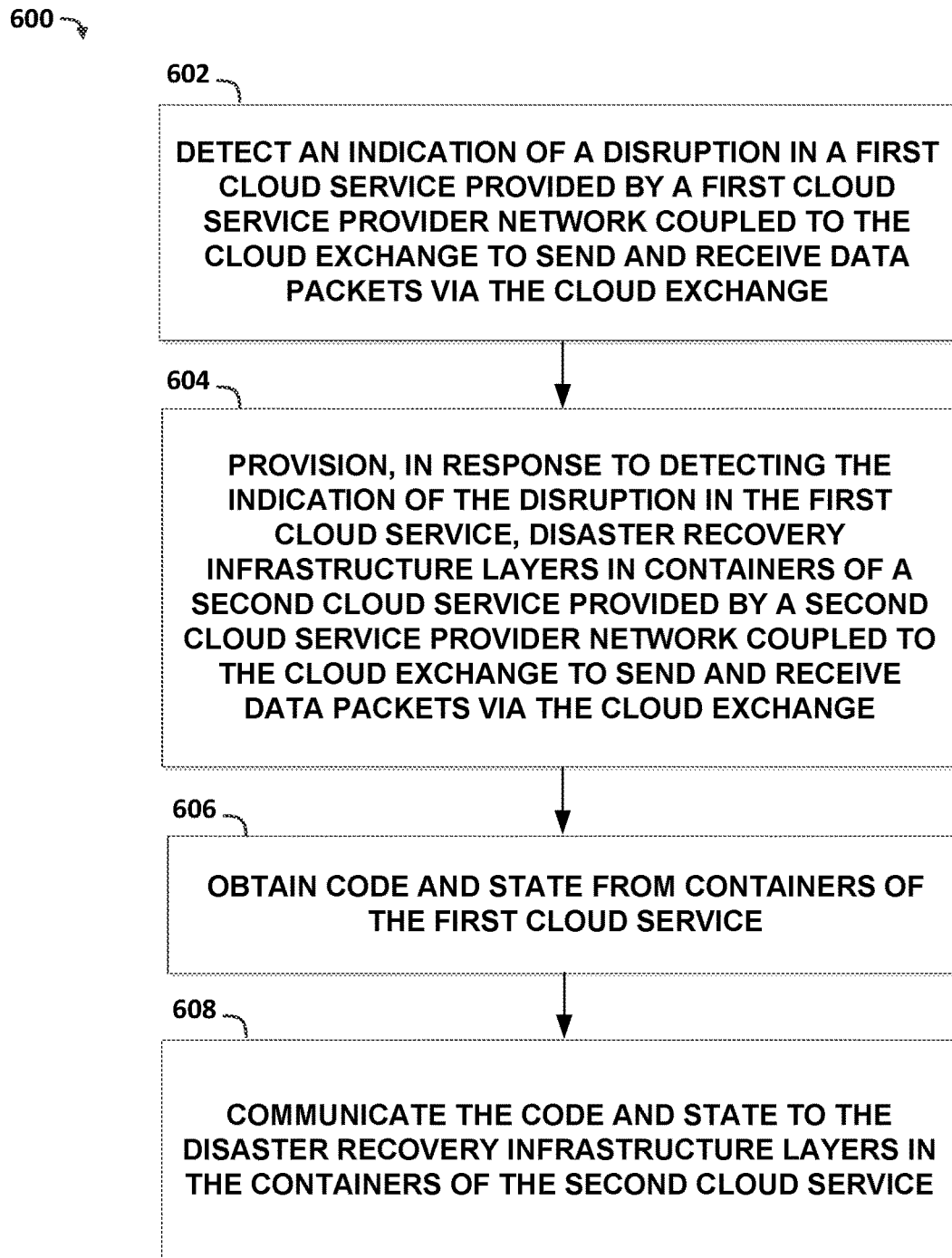
FIG. 6 is a flowchart illustrating an example method in accordance with example techniques of this disclosure.

FIG. 6 is a flowchart illustrating an example method according to techniques of this disclosure. FIG. 6 is described with reference to FIGS. 1 and 4; however, FIG. 6 may apply generally to any of various techniques of this disclosure. In some examples, a cloud exchange (e.g., cloud exchange 102, and in some particular examples, DR manager 140 of orchestration engine 106 of cloud exchange 102) may detect an indication of a disruption in a first cloud service provided by a first cloud service provider network coupled to the cloud exchange to send and receive data packets via the cloud exchange (e.g., a disruption in cloud service 124A) (602). The cloud exchange (e.g., cloud exchange 102, and in some particular examples, DR manager 140 of orchestration engine 106 of cloud exchange 102) may provision, in response to detecting the indication of the disruption in the first cloud service, disaster recovery infrastructure layers in containers of a second cloud service provided by a second cloud service provider network coupled to the cloud exchange to send and receive data packets via the cloud exchange (604). The cloud exchange (e.g., cloud exchange 102, and in some particular examples, DR manager 140 of orchestration engine 106 of cloud exchange 102) may obtain code and state from containers of the first cloud service (606). The cloud exchange (e.g., cloud exchange 102, and in some particular examples, DR manager 140 of orchestration engine 106 of cloud exchange 102) may communicate the code and state to the disaster recovery infrastructure layers in the containers of the second cloud service (608). The cloud exchange (e.g., cloud exchange 102, and in some particular examples, DR manager 140 of orchestration engine 106 of cloud exchange 102) may also buffer service requests from an enterprise, and subsequently output the buffered service requests to the disaster recovery infrastructure layers in the containers of the second cloud service after the DR infrastructure is provisioned at the second cloud service.

While specific implementations of containers such as Docker, LXC, and CoreOS Rocket containers are referred to in some examples herein, various embodiments may also use or be embodied with other types and variations of containers that may not necessarily conform to all aspects of a definition or specification of any specific container implementation. All references herein to the specific example of Docker containers may be understood to analogously encompass other types of containers and other types of lightweight counterparts to virtual machines that may provide a virtualized environment for execution of a microservice or other application without including the full set of features of a complete virtual machine.

Figure 7:
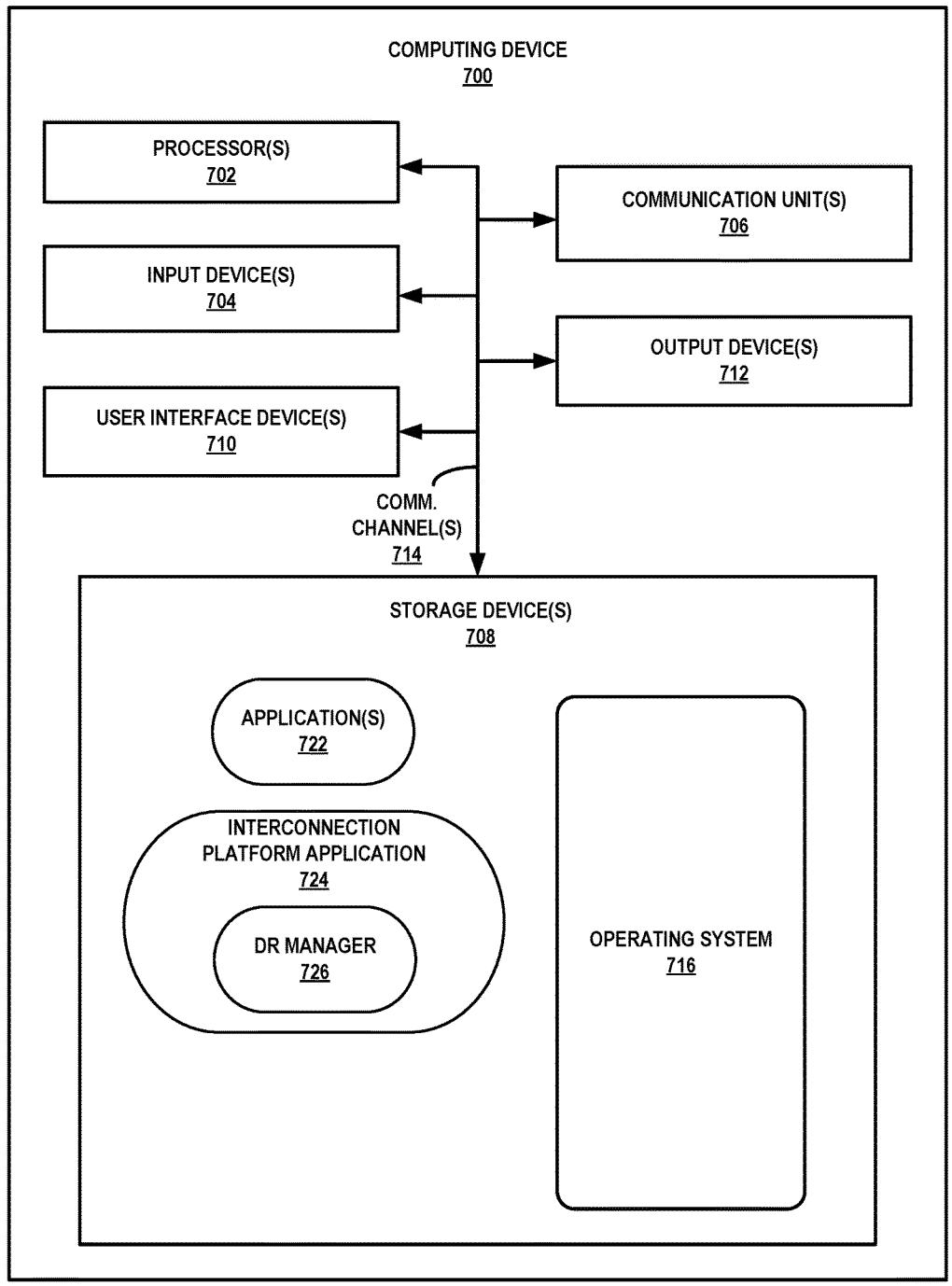
FIG. 7 is a block diagram illustrating one example of a computing device that operates in accordance with one or more techniques of the present disclosure.

FIG. 7 is a block diagram illustrating one example of a computing device that operates in accordance with one or more techniques of the present disclosure. FIG. 7 may illustrate a particular example of a server or other computing device 700 that includes one or more processor(s) 702 for executing at least a portion of interconnection platform 724, or any other computing device described herein. Other examples of computing device 700 may be used in other instances. Although shown in FIG. 7 as a stand-alone computing device 700 for purposes of example, a computing device may be any component or system that includes one or more processors or other suitable computing environment for executing software instructions and, for example, need not necessarily include one or more elements shown in FIG. 7 (e.g., computing device 700 may not include communication units 706 and/or user interface devices 710; and in some examples components such as storage device(s) 708 may not be colocated or in the same chassis as other components). Computing device 700 may be located and execute, for example, at another interconnection facility, or at a branch office or cloud computing environment employed or used by a colocation facility or cloud exchange provider.

As shown in the specific example of FIG. 7, computing device 700 includes one or more processors 702, one or more input devices 704, one or more communication units 706, one or more output devices 712, one or more storage devices 708, and one or more user interface (UI) devices 710. Computing device 700, in one example, further includes one or more applications 722, interconnection platform application 724, and operating system 716 that are executable by computing device 700. Each of components 702, 704, 706, 708, 710, and 712 are coupled (physically, communicatively, and/or operatively) for inter-component communications. In some examples, communication channels 714 may include a system bus, a network connection, an inter-process communication data structure, or any other method for communicating data. As one example, components 702, 704, 706, 708, 710, and 712 may be coupled by one or more communication channels 714.

Processors 702, in one example, are configured to implement functionality and/or process instructions for execution within computing device 700. For example, processors 702 may be capable of processing instructions stored in storage device 708. Examples of processors 702 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 708 may be configured to store information within computing device 700 during operation. Storage device 708, in some examples, is described as a computer-readable storage medium. In some examples, storage device 708 is a memory device, meaning that a primary purpose of storage device 708 is not long-term data storage. Storage device 708, in some examples, is described as a volatile memory, meaning that storage device 708 does not maintain stored contents when the computer is turned off. Examples of volatile memories include random access memories (RAM), dynamic random access memories (DRAM), static random access memories (SRAM), and other forms of volatile memories known in the art. In some examples, storage device 708 is used to store program instructions for execution by processors 702. Storage device 708, in one example, is used by software or applications running on computing device 700 to temporarily store information during program execution.

Storage devices 708, in some examples, also include one or more computer-readable storage media. Storage devices 708 may be configured to store larger amounts of information than volatile memory. Storage devices 708 may further be configured for long-term storage of information. In some examples, storage devices 708 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 700, in some examples, also includes one or more communication units 706. Computing device 700, in one example, utilizes communication units 706 to communicate with external devices via one or more networks, such as one or more wired/wireless/mobile networks. Communication units 706 may include a network interface card, such as an Ethernet card, an optical transceiver, a radio frequency transceiver, or any other type of device that can send and receive information. Other examples of such network interfaces may include 3G, 4G and WiFi radios. In some examples, computing device 700 uses communication unit 706 to communicate with an external device.

Computing device 700, in various examples, also includes one or more user interface devices 710. User interface devices 710, in some examples, are configured to receive input from a user through tactile, audio, or video feedback. Examples of user interface devices(s) 710 include a presence-sensitive display, a mouse, a keyboard, a voice responsive system, video camera, microphone or any other type of device for detecting a command from a user. In some examples, a presence-sensitive display includes a touch-sensitive screen.

One or more output devices 712 may also be included in computing device 700. Output device 712, in some examples, is configured to provide output to a user using tactile, audio, or video outputs or stimuli. Output device 712, in various examples, includes a presence-sensitive display, a sound card, a video graphics adapter card, or any other type of device for converting a signal into an appropriate form understandable to humans and/or machines. Additional examples of output device 712 include a speaker, a cathode ray tube (CRT) monitor, a liquid crystal display (LCD), or any other type of device that can generate intelligible output to a user.

Computing device 700 may include operating system 716. Operating system 716, in some examples, controls the operation of components of computing device 700. In various examples, operating system 716 may facilitate the communication of one or more applications 722 and interconnection platform application 724 with processors 702, communication unit 706, storage device 708, input device 704, user interface device 710, and output device 712.

Applications 722 and interconnection platform application 724 may also include program instructions and/or data that are executable by computing device 700. Interconnection platform application 724 may include a DR manager 726. DR manager 726 may include instructions for causing computing device to perform the techniques described in the present disclosure with respect to DR manager 140 and/or DR manager 510. As one example, DR manager 726 may include instructions that cause computing device 700 to detect disruptions in a first cloud service provider network, provision a temporary DR infrastructure interface layer to buffer a service request queue, select a backup cloud service provider network, provision DR infrastructure layers in containers of the backup cloud service provider network, copy code and state from containers of the first cloud service provider network to the DR infrastructure layers, apply the buffered service requests from the temporary DR infrastructure interface layer to the DR infrastructure interface layer at the backup cloud service provider network, redirect incoming service requests to the backup cloud service provider network, and perform any other functions of a DR process in accordance with the techniques of this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), Flash memory, a hard disk, a CD-ROM, a floppy disk, a cassette, magnetic media, optical media, or other computer readable media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
configuring, by a cloud exchange and in an orchestration engine executed by the cloud exchange, a disaster recovery infrastructure interface layer for an enterprise network coupled to the cloud exchange;
provisioning, by the cloud exchange and in a networking platform of the cloud exchange, a first virtual circuit between the enterprise network and a first cloud service provided by a first cloud service provider network of a plurality of cloud service provider networks coupled to the cloud exchange, wherein the first virtual circuit is configured to transport, via the cloud exchange, data packets between the enterprise network and containers of the first cloud service provided by the first cloud service provider network, and wherein the cloud exchange logically isolates each of the plurality of cloud service provider networks from one another;
provisioning, by the cloud exchange and in the networking platform of the cloud exchange, a second virtual circuit between the enterprise network and a second cloud service provided by a second cloud service provider network of the plurality of cloud service provider networks coupled to the cloud exchange, wherein the second virtual circuit is configured to transport, via the cloud exchange, data packets between the enterprise network and containers of the second cloud service provided by the second cloud service provider network;
receiving, with the cloud exchange and over the first virtual circuit, a service request from the enterprise network and addressed to one of the containers of the first cloud service of the first cloud service provider network;
detecting, with the cloud exchange, an indication of a disruption in the first cloud service provided by the first cloud service provider network; and
in response to detecting the indication of the disruption in the first cloud service:
re-directing, with the cloud exchange, the service request from the enterprise network to the disaster recovery infrastructure interface layer;
provisioning, with the disaster recovery infrastructure interface layer, disaster recovery infrastructure compute layers in the containers of the second cloud service provided by the second cloud service provider network, wherein the disaster recovery infrastructure compute layers in the containers of the second cloud service replicate a network topology of the containers of the first cloud service;
obtaining, with the disaster recovery infrastructure interface layer, code for the first cloud service and state for the first cloud service from the containers of the first cloud service;
communicating, with the disaster recovery infrastructure interface layer, the code and the state for the first cloud service to the disaster recovery infrastructure compute layers in the containers of the second cloud service;

storing, with the disaster recovery infrastructure interface layer and prior to the disaster recovery infrastructure compute layers in the containers of the second cloud service being operational to handle the service request, the service request; and sending, with the disaster recovery infrastructure interface layer and after the disaster recovery infrastructure compute layers are operational to handle the service request, the service request to the containers of the second cloud service via the second virtual circuit.

2. The method of claim 1, wherein sending, after the disaster recovery infrastructure compute layers are operational to handle the service request, the service request to the containers of the second cloud service comprises:

determining, by the disaster recovery infrastructure interface layer, that the disaster recovery infrastructure compute layers in the containers of the second cloud service are operational to handle the service request; and sending, with the disaster recovery infrastructure interface layer and in response to determining the disaster recovery infrastructure compute layers in the containers of the second cloud service are operational to handle the service request, the service request.

3. The method of claim 1, further comprising: selecting, with the cloud exchange, the second cloud service provided by the second cloud service provider network from among a plurality of available cloud services provided by the plurality of cloud service provider networks to host the disaster recovery infrastructure compute layers, prior to provisioning the disaster recovery infrastructure compute layers in the containers of the second cloud service.

4. The method of claim 1, wherein provisioning the disaster recovery infrastructure compute layers in the containers of the second cloud service of the second cloud service provider network comprises provisioning, by a disaster recovery manager of the orchestration engine executed by the cloud exchange, the disaster recovery infrastructure compute layers in the containers of the second cloud service of the second cloud service provider network.

5. The method of claim 1, wherein provisioning the disaster recovery infrastructure compute layers comprises provisioning an interface layer, a storage layer, a compute layer, and a network layer in the containers of the second cloud service, wherein the interface layer, the storage layer, the compute layer, and the network layer in the containers of the second cloud service replicate an interface layer, a storage layer, a compute layer, and a network layer in the containers of the first cloud service.

6. The method of claim 1, further comprising provisioning, by the cloud exchange and in a networking platform of the cloud exchange, a third virtual circuit between the first cloud service provided by the first cloud service provider network and the second cloud service provided by the second cloud service provider network, wherein the third virtual circuit is configured to transport data packets between the containers of the first cloud service and the containers of the second cloud service.

7. The method of claim 6, wherein obtaining the code for the first cloud service and the state for the first cloud service from the containers of the first cloud service comprises receiving, by the cloud exchange and from the containers of the first cloud service provided by the first cloud service provider network via the third virtual circuit, the code for the first cloud service and the state for the first cloud service, and wherein communicating, with the disaster recovery infrastructure interface layer, the code and the state for the first cloud service to the disaster recovery infrastructure compute layers in the containers of the disaster recovery infrastructure compute layers of the second cloud service comprises transmitting, by the disaster recovery infrastructure interface layer and to the containers of the second cloud service provided by the second cloud service provider network via the third virtual circuit, the code and the state for the first cloud service.

8. The method of claim 1, further comprising:

in response to detecting the indication of the disruption in the first cloud service, placing a hold on operations of one or more of the containers of the first cloud service prior to obtaining the code and the state from the containers of the first cloud service; and re-starting the operations from the one or more of the containers of the first cloud service in the containers of the second cloud service subsequent to communicating the code and the state for the first cloud service to the disaster recovery infrastructure compute layers in the containers of the second cloud service.

9. The method of claim 8, wherein placing the hold on the operations of the one or more of the containers of the first cloud service comprises locking state stored to an in-memory data store at the first cloud service.

10. The method of claim 1, wherein the state from the containers of the first cloud service comprises one or more of: application data, application stack configuration data, microservices state, memory data, commands, process information, and instruction pointers.

11. The method of claim 1, wherein the code comprises executable instruction code for one or more of: applications, application specific libraries, microservices, and microservice specific libraries.

12. The method of claim 1, wherein obtaining the state for the first cloud service from the containers of the first cloud service comprises copying the state for the first cloud service from the containers of the first cloud service while the containers of the first cloud service are executing one or more applications.

13. The method of claim 1, wherein detecting the indication of the disruption in the first cloud service comprises detecting an indication of a qualifying disruption in accordance with disaster recovery configuration settings selected via user inputs to the cloud exchange.

14. The method of claim 13, wherein the disaster recovery configuration settings comprise:

criteria to define disruptions in the first cloud service that qualify as the qualifying disruption; and criteria for selecting the second cloud service.

15. The method of claim 13, further comprising providing, with the cloud exchange, an interface for receiving the user inputs to select the disaster recovery configuration settings.

16. The method of claim 1, further comprising:

associating, with the disaster recovery infrastructure interface layer, a container identifier and a network address of a first container of the containers of the first cloud service with a container identifier and a network address of a second container of the containers of the second cloud service; and communicating, with the disaster recovery infrastructure interface layer, code and state from the first container to the second container based on the association.

17. The method of claim 1, further comprising:
in response to detecting the indication of the disruption in the first cloud service, placing a hold on service requests received from the enterprise network over the first virtual circuit, wherein the service requests are addressed to one of the containers of the first cloud service; and
re-directing the service requests from the enterprise network to the disaster recovery infrastructure compute layers in the containers of the second cloud service via the second virtual circuit, subsequent to the code and the state being communicated to the disaster recovery infrastructure compute layers.

18. The method of claim 1, further comprising updating, in a routing table of an orchestration engine for the cloud exchange, routes to the containers of the first cloud service with routes to the containers of the second cloud service, subsequent to communicating the code and the state to the disaster recovery infrastructure compute layers in the containers of the second cloud service.

19. The method of claim 1, wherein the containers of the first cloud service and the containers of the second cloud service are isolated user-space instances executing on respective host computing devices of a plurality of host computing devices, each of the instances providing an operating system kernel interface, an application suite, and application-specific libraries and sharing an operating system and common libraries with each other instance executing on the host.

20. The method of claim 1, wherein to replicate the network topology of the containers of the first cloud service, the disaster recovery infrastructure compute layers in the containers of the second cloud service replicate a template-driven workflow of the first cloud service.

21. The method of claim 1, wherein obtaining, with the disaster recovery infrastructure interface layer, the code for the first cloud service and the state for the first cloud service from the containers of the first cloud service comprises:
issuing, by the disaster recovery infrastructure interface layer and to the containers of the first cloud service of the first cloud service provider network, an instruction to cause the containers of the first cloud service to transmit, to the disaster recovery infrastructure interface layer, code for the first cloud service and state for the first cloud service; and
receiving, by the disaster recovery infrastructure interface layer, the code for the first cloud service and the state for the first cloud service from the containers of the first cloud service.

22. The method of claim 1,
wherein the method further comprises installing, with the disaster recovery infrastructure interface layer, a state replication microservice on the containers of the first cloud service; and
wherein obtaining, with the disaster recovery infrastructure interface layer, the code for the first cloud service and the state for the first cloud service from the containers of the first cloud service comprises invoking, with the disaster recovery infrastructure interface layer, the state replication microservice to cause the containers of the first cloud service to transmit the code for the first cloud service and the state for the first cloud service to the disaster recovery infrastructure interface layer.

23. The method of claim 1, wherein obtaining the code for the first cloud service and the state for the first cloud service from the containers of the first cloud service comprises obtaining:
a current container state of the containers of the first cloud service;
a current configuration of the containers of the first cloud service; and
an application or service running inside the containers of the first cloud service.

24. A computing system comprising:
at least one processor operably coupled to a memory; and
an orchestration engine for a cloud exchange, the orchestration engine configured for execution by the at least one processor, wherein the orchestration engine is configured to:
configure a disaster recovery infrastructure interface layer for an enterprise network coupled to the cloud exchange;
provision, in a networking platform of the cloud exchange, a first virtual circuit between the enterprise network and a first cloud service provided by a first cloud service provider network of a plurality of cloud service provider networks coupled to the cloud exchange, wherein the first virtual circuit is configured to transport, via the cloud exchange, data packets between the enterprise network and containers of the first cloud service provided by the first cloud service provider network, and wherein the cloud exchange logically isolates each of the plurality of cloud service provider networks from one another;
provision, in the networking platform of the cloud exchange, a second virtual circuit between the enterprise network and a second cloud service provided by a second cloud service provider network of the plurality of cloud service provider networks coupled to the cloud exchange, wherein the second virtual circuit is configured to transport, via the cloud exchange, data packets between the enterprise network and containers of the second cloud service provided by the second cloud service provider network;
receive, over the first virtual circuit, a service request from the enterprise network and addressed to one of the containers of the first cloud service of the first cloud service provider network;
detect an indication of a disruption in the first cloud service provided by the first cloud service provider network; and
in response to detecting the indication of the disruption in the first cloud service:
re-direct the service request from the enterprise network to the disaster recovery infrastructure interface layer, wherein the disaster recovery infrastructure interface layer is configured to:
provision disaster recovery infrastructure compute layers in the containers of the second cloud service provided by the second cloud service provider network, wherein the disaster recovery infrastructure compute layers in the containers of the second cloud service replicate a network topology of the containers of the first cloud service;
obtain code for the first cloud service and state for the first cloud service from the containers of the first cloud service;

communicate the code and the state for the first cloud service to the disaster recovery infrastructure compute layers in the containers of the second cloud service;

store, prior to the disaster recovery infrastructure compute layers in the containers of the second cloud service being operational to handle the service request, the service request; and send, after the disaster recovery infrastructure compute layers are operational to handle the service request, the service request to the containers of the second cloud service via the second virtual circuit.

25. A non-transitory computer-readable medium comprising instructions for causing at least one programmable processor of a cloud exchange to:

configure, in an orchestration engine executed by the cloud exchange, a disaster recovery infrastructure interface layer for an enterprise network coupled to the cloud exchange;

provision, in a networking platform of the cloud exchange, a first virtual circuit between the enterprise network coupled to the cloud exchange and a first cloud service provided by a first cloud service provider network of a plurality of cloud service provider networks coupled to the cloud exchange, wherein the first virtual circuit is configured to transport, via the cloud exchange, data packets between the enterprise network and containers of the first cloud service provided by the first cloud service provider network, and wherein the cloud exchange logically isolates each of the plurality of cloud service provider networks from one another;

provision, in the networking platform of the cloud exchange, a second virtual circuit between the enterprise network and a second cloud service provided by a second cloud service provider network of the plurality of cloud service provider networks coupled to the cloud exchange, wherein the second virtual circuit is configured to transport, via the cloud exchange, data packets between the enterprise network and containers of the second cloud service provided by the second cloud service provider network;

receive, over the first virtual circuit, a service request from the enterprise network and addressed to one of the containers of the first cloud service of the first cloud service provider network;

detect an indication of a disruption in the first cloud service provided by the first cloud service provider network; and in response to detecting the indication of the disruption in the first cloud service:

re-direct the service request from the enterprise network to the disaster recovery infrastructure interface layer, wherein the disaster recovery infrastructure interface layer is configured to:

provision disaster recovery infrastructure compute layers in the containers of the second cloud service provided by the second cloud service provider network, wherein the disaster recovery infrastructure compute layers in the containers of the second cloud service replicate a network topology of the containers of the first cloud service;

obtain code for the first cloud service and state for the first cloud service from the containers of the first cloud service;

communicate the code and the state for the first cloud service to the disaster recovery infrastructure compute layers in the containers of the second cloud service;

store, prior to the disaster recovery infrastructure compute layers in the containers of the second cloud service being operational to handle the service request, the service request; and send, after the disaster recovery infrastructure compute layers are operational to handle the service request, service request to the containers of the second cloud service via the second virtual circuit.

* * * * *